(12) United States Patent
Grady et al.

(10) Patent No.: US 8,010,728 B1
(45) Date of Patent: Aug. 30, 2011

(54) MULTI-FUNCTION DOCKING ASSEMBLY FOR PORTABLE DIGITAL MEDIA STORAGE AND PLAYBACK DEVICE

(75) Inventors: Jeff Grady, Charleston, SC (US); Vincent K Gustafson, Chapel Hill, NC (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1094 days.

(21) Appl. No.: 11/557,473

(22) Filed: Nov. 7, 2006

Related U.S. Application Data

(60) Provisional application No. 60/734,058, filed on Nov. 7, 2005.

(51) Int. Cl.
G06F 13/00 (2006.01)
G06F 21/04 (2006.01)
G06F 13/36 (2006.01)

(52) U.S. Cl. ........................ 710/303; 713/182
(58) Field of Classification Search .............. 710/303
See application file for complete search history.

(56) References Cited

U.S. PATENT DOCUMENTS

| | | | |
|---|---|---|---|
| 5,319,716 A | 6/1994 | McGreevy | |
| 5,448,757 A | 9/1995 | Hirata | |
| 5,771,441 A | 6/1998 | Alstatt | |
| 5,829,993 A * | 11/1998 | Wu ........................ | 439/131 |
| 5,839,919 A * | 11/1998 | Chen ...................... | 439/529 |
| 5,860,824 A | 1/1999 | Fan | |
| 5,970,390 A | 10/1999 | Koga et al. | |
| 6,052,603 A | 4/2000 | Kinzalow et al. | |
| 6,138,041 A * | 10/2000 | Yahia ...................... | 455/569.2 |
| 6,157,163 A | 12/2000 | Blackwood | |
| 6,163,711 A | 12/2000 | Juntunen et al. | |
| 6,175,926 B1 | 1/2001 | Fogle | |
| 6,240,297 B1 | 5/2001 | Jadoul | |
| 6,292,440 B1 | 9/2001 | Lee | |
| 6,317,497 B1 | 11/2001 | Ou | |
| 6,339,699 B1 * | 1/2002 | Hirai et al. ............. | 455/575.1 |
| 6,381,452 B1 | 4/2002 | Tien et al. | |
| 6,396,769 B1 | 5/2002 | Polany | |
| 6,420,849 B2 | 7/2002 | Murphy | |

(Continued)

FOREIGN PATENT DOCUMENTS

DE 102 17 365 C1 8/2003

(Continued)

OTHER PUBLICATIONS

"Read-only memory"; Wikipedia, the Free Encyclopedia; Revision date Nov. 6, 2005; all pages.*

(Continued)

*Primary Examiner* — Ryan Stiglic
(74) *Attorney, Agent, or Firm* — Sherry Womack

(57) ABSTRACT

A multi-function docking assembly electrically coupleable with a portable digital media storage and playback device is provided. The assembly includes a body adapted to receive and retain the media device, an electrical coupling adapted to engage the media device when the same is received by the body, a transmitter for wirelessly transmitting media content to an external receiving device, an electrical circuit element to conduct power, and an authentication element. Any of various authentication methods are use to ensure and/or regulate interoperability between the media device and the docking assembly. Multiple discrete tiers of functionality of the audio player and/or portable digital media storage and playback device may be enabled or disabled based on an authentication operation.

54 Claims, 19 Drawing Sheets

U.S. PATENT DOCUMENTS

| | | | |
|---|---|---|---|
| 6,423,892 | B1 | 7/2002 | Ramaswamy |
| 6,509,716 | B2 | 1/2003 | Yi |
| 6,532,152 | B1 | 3/2003 | White et al. |
| 6,573,683 | B2 | 6/2003 | Chang |
| 6,591,085 | B1 | 7/2003 | Grady |
| 6,608,399 | B2 | 8/2003 | McConnell et al. |
| 6,631,098 | B2 | 10/2003 | Chang et al. |
| 6,671,494 | B1 | 12/2003 | James |
| 6,681,120 | B1 | 1/2004 | Kim |
| 6,762,585 | B2 * | 7/2004 | Liao ............................. 320/107 |
| 6,781,519 | B1 | 8/2004 | Diaz |
| 6,782,239 | B2 | 8/2004 | Johnson et al. |
| 6,788,528 | B2 | 9/2004 | Enners et al. |
| 6,798,173 | B2 | 9/2004 | Hsu |
| 6,836,643 | B2 | 12/2004 | Shealtiel |
| 6,973,477 | B1 | 12/2005 | Martino |
| 7,013,164 | B2 | 3/2006 | Lin |
| 7,187,947 | B1 | 3/2007 | White et al. |
| 7,280,802 | B2 | 10/2007 | Grady |
| 2001/0006336 | A1 | 7/2001 | Yi et al. |
| 2001/0049566 | A1 | 12/2001 | Kim |
| 2002/0032042 | A1 | 3/2002 | Poplawsky et al. |
| 2002/0038432 | A1 | 3/2002 | Hsu |
| 2002/0077834 | A1 | 6/2002 | Estevez |
| 2002/0086703 | A1 | 7/2002 | Dimenstein et al. |
| 2002/0086716 | A1 | 7/2002 | Pan |
| 2002/0098813 | A1 | 7/2002 | Likourezos et al. |
| 2002/0105861 | A1 | 8/2002 | Leapman |
| 2002/0132651 | A1 | 9/2002 | Jinnouchi |
| 2002/0151327 | A1 | 10/2002 | Levitt |
| 2002/0173866 | A1 | 11/2002 | Dangberg et al. |
| 2003/0026439 | A1 | 2/2003 | Yamamoto |
| 2003/0036357 | A1 | 2/2003 | McGowan |
| 2003/0114133 | A1 | 6/2003 | Enners |
| 2003/0154355 | A1 | 8/2003 | Fernandez |
| 2003/0194968 | A1 | 10/2003 | Young |
| 2003/0236075 | A1 | 12/2003 | Johnson et al. |
| 2004/0091124 | A1 | 5/2004 | Chua et al. |
| 2004/0107253 | A1 | 6/2004 | Ludwig et al. |
| 2004/0151327 | A1 | 8/2004 | Marlow |
| 2004/0193900 | A1 | 9/2004 | Nair |
| 2004/0224638 | A1 | 11/2004 | Fadell et al. |
| 2005/0047071 | A1 | 3/2005 | Tse Chun Hin |
| 2005/0049009 | A1 | 3/2005 | Yamamoto |
| 2005/0062695 | A1 | 3/2005 | Cok et al. |
| 2005/0135790 | A1 | 6/2005 | Hutten |
| 2005/0170744 | A1 | 8/2005 | Smith et al. |
| 2005/0195848 | A1 | 9/2005 | Braneci et al. |
| 2005/0227773 | A1 | 10/2005 | Lu et al. |
| 2006/0031617 | A1 | 2/2006 | Falcon |
| 2006/0039263 | A1 | 2/2006 | Trotabas |
| 2006/0052144 | A1* | 3/2006 | Seil et al. .................... 455/575.1 |
| 2006/0156415 | A1* | 7/2006 | Rubinstein et al. .............. 726/27 |
| 2006/0184978 | A1 | 8/2006 | Casey et al. |
| 2006/0274910 | A1 | 12/2006 | Schul et al. |
| 2007/0077784 | A1 | 4/2007 | Kalayjian et al. |
| 2007/0086724 | A1 | 4/2007 | Grady et al. |
| 2007/0114974 | A1 | 5/2007 | Grady |
| 2007/0124804 | A1* | 5/2007 | Burnham et al. .................. 726/5 |
| 2007/0300155 | A1 | 12/2007 | Laefer et al. |
| 2008/0015717 | A1 | 1/2008 | Griffin, Jr. et al. |
| 2008/0025172 | A1* | 1/2008 | Holden et al. ............. 369/47.35 |

FOREIGN PATENT DOCUMENTS

| | | | |
|---|---|---|---|
| JP | 3074125 U | 7/1991 | |
| JP | 6-309854 A | 11/1994 | |
| JP | 07-029981 U | 1/1995 | |
| JP | 10-507052 A | 7/1998 | |
| JP | 2001-093585 A | 4/2001 | |
| JP | 2002-007004 A1 | 1/2002 | |
| JP | 2002-178857 A | 6/2002 | |
| KR | 10-2001-0008949 A1 | 2/2001 | |
| KR | 10-2002-0010350 A | 2/2002 | |
| KR | 10-2002-0014875 A1 | 2/2002 | |
| KR | 10-2002-054686 A | 7/2002 | |
| TW | 463747 | 11/2001 | |
| TW | 463747 B | 11/2001 | |
| TW | 487260 B | 5/2002 | |
| TW | 514321 | 12/2002 | |
| TW | M245676 B | 10/2004 | |
| TW | M247950 B | 10/2004 | |
| TW | M249138 B | 11/2004 | |
| TW | M253152 B | 12/2004 | |
| TW | M262927 B | 4/2005 | |
| TW | M268823 B | 6/2005 | |
| TW | M294783 B | 7/2006 | |
| WO | WO 9632783 A1 * | 10/1996 | |
| WO | WO 9965210 A1 * | 12/1999 | |
| WO | WO-02/37499 A1 | 5/2002 | |

OTHER PUBLICATIONS

Microsoft Press; "Computer Dictionary"; Microsoft Press; Second Edition; 1994; pp. 321 and 342.*

Free On-Line Dictionary of Computing; "ROM & PROM"; Free On-Line Dictionary of Computing; May 9, 1995; 2 pages.*

Evangelista, Benny, Dial M for music, San Francisco Chronicle—found online at http://www.sfgate.com/cgi-bin/article.cgi?file=/chronicle/archive/2000/11/01/BU105818.DTL, Nov. 1, 2000.

World's first MP3 phone, Popular Mechanics—found online at http://www.popularmechanics.com/technology/upgrade/1279751.html, Oct. 1, 2000.

Smith, Tony, Sprint PCS to launch mobile MP3 scheme, The Register—found online at http://www.theregister.co.uk/2000/11/01/sprint_pcs_to_launch_mobile/, Nov. 1, 2000.

Wearden, Graeme, Virgin rolls out world's first MP3 phone, Tech news on ZDNet—found online at http://news.zdnet.com/2100-9595_22-523423.html, Aug. 28, 2000.

Williams, Martyn, Sony squeezes MP3 player into cell phone, PC World.com—found online at http://archives.cnn.com/3000/TECH/computing/12/12/mp3.cell.phone.idg/index.html, Dec. 12, 2000.

Arkon Resources, Inc., Universal Multimedia mounts for pocket PC handheld computers, Consumer Electronics Show 2001, Jan. 2001, pp. #16444.

Arkon Resources, Inc., CD mounting kist (sic) by Arkon Resources, Found online Jan. 11, 2007 at http://web.archive.org/web/19991005210543/arkon.com/cd.html, Oct. 5, 1999.

Arkon Resources, Inc., Portable CD Player Mounting Kits by Arkon Resources, Found online Jan. 11, 2007 at http://web.archive.org/web/20001019004111/www.arkon.com/cd.html, Oct. 19, 2000.

Arkon Resources, Inc., Arkon Resources, Inc.—Multimedia PDA Mounts, Found online Jan. 11, 2007 at http://web.archive.org/web/20010813012145/www.arkon.com/multimedia.html, Aug. 13, 2001.

Arkon Resources, Inc., SF120 SoundFeeder Wireless Audio Adapter Arkon Resources, Inc., Found online Jan. 11, 2007 at http://web.archive.org/web/20010820131530/www.arkon.com/SF120.htm, Aug. 20, 2001.

Arkon Resources, Inc., SF121 SoundFeeder FM Stereo Transmitter, Found online Jan. 11, 2007 at http://web.archive.org/web/20010804135107/www.arkon.com/SF121.htm, Aug. 4, 2001.

Arkon Resources, Inc., SF145 CD-Mount Portable CD Mount by Arkon Resources, Inc., Found online Jan. 11, 2007 at http://web.archive.org/web/20001029113500/www.arkon.com/SF145.htm, Oct. 29, 2000.

Arkon Resources, Inc., SF340 CD-Mount Portable CD Mount by Arkon Resources, Inc., Found online Jan. 11, 2007 at http://web.archive.org/web/20001208183400/www.arkon.com/SF340.htm, Dec. 8, 2000.

Arkon Resources, Inc., SF342 CD-Mount Portable CD Mount by Arkon Resources, Inc., Found online Jan. 11, 2007 at http://web.archive.org/web/200010029124413/www.arkon.com/SF342.htm, Oct. 29, 2000.

Arkon Resources, Inc., Arkon Resources, Inc.—SoundFeeder Audio Adapters, Found online Jan. 11, 2007 at http://web.archive.org/web/20010813021714/www.arkon.com/sf.html, Aug. 13, 2001.

Arkon Resources, Inc., Arkon Multimedia PDA Mounting Solutions for use with Compaq iPAQ Pocket PC, Found online Jan. 11, 2007 at http://web.archive.org/web/20020310082543/www.arkon.com/expansions.html, Mar. 10, 2002.

Application Note 190—Challenge and Response with 1-Wire SHA devices, Found online Mar. 28, 2007 at http://www.maxim-ic.com/appnotes.cfm/appnote_number/190, Mar. 12, 2002, Publisher: Maxim Integrated Products.

DS2703—SHA-1 Battery Pack Authentication IC, Found online Mar. 28, 2007 at http://datasheets.maxim-ic.com/en/ds/DS2703.pdf, 2007, Publisher: Maxim Integrated Products.

Dr. Bott, LLC, Dr. Botts LLC iPod Universal Connection Kit with FM Transmitter, Found online Jan. 11, 2007 at http://www.drbott.com/prod/db.lasso?code=0142-IPCK, 1999.

Federal Communications Commission, Grant of Equipment Authorization—FCC Identifier:ME2-SF345-SF340—Grantee: Arkon Resources, Inc., Found online Jan. 11, 2007 at http://gullfoss2.fcc.gov/prod.oet/cf/eas/reports/Eas731GrantForm.cfm?mode=COPY&Req..., Feb. 23, 1996.

Di Jasio, Lucio, Using KEELOQ to Validate Subsystem Compatibility—AN827, Application Notes—found online Mar. 28, 2007 at http://ww1.microchip.com/downloads/en/AppNotes/00827a.pdf, 2002, Publisher: Microchip Technology Inc.

Priority Tech Inc., Voice Magic Plus, Found on-line Jun. 21, 2006 at http://www.gadgetcentral.com/voicecell_intro.html, Mar. 30, 2000.

Priority Tech Inc., Priority Tech Products—Platinum Series; Hands-Free Kits, Found on-line on Jul. 19, 2006 at http://web.archive.org.web/20010805114853/www.priorityusa.com/newproducts_fullbands.html, 1999, Publisher: Priority Tech, Inc.

Roth, Aaron, Deposition in *Netalog* v. *Griffin Technology, Inc.* litigation re U.S. Patent No. 6,591,085 in M.D.N.C. Case 1:04-CV 00850, pp. 1-8, 10-17, 19-28, 30-41, 49-72, 84-91, 95-98 & Ex. C, E, F, Q, R, S, T, U, V, W, 160, Oct. 27, 2005.

Vega, Michael, Complete battery-pack design for one- or two-cell portable applications, Analog Applications Journal—found online Mar. 28, 2007 at http://focus.ti.com/lit/an/slyt248/slyt248.pdf, 2006, pp. 14-16, vol. 3Q, Publisher: Texas Instruments, Inc.

Wagner, Samuel C., Arkon's Multimedia PDA Mount, Found online Aug. 11, 2006 at http://web.archive.org/web/20010803155949/www.pocketpcpower.net/PDAMount.htm, Aug. 3, 2001.

* cited by examiner

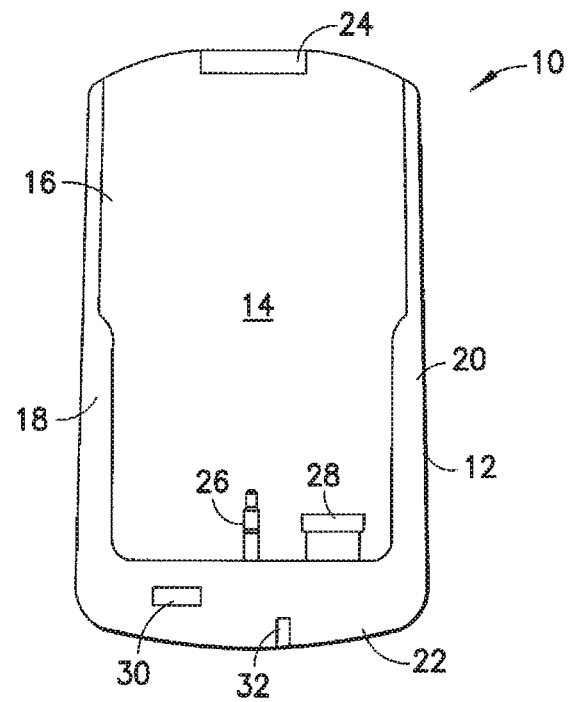
FIG._1
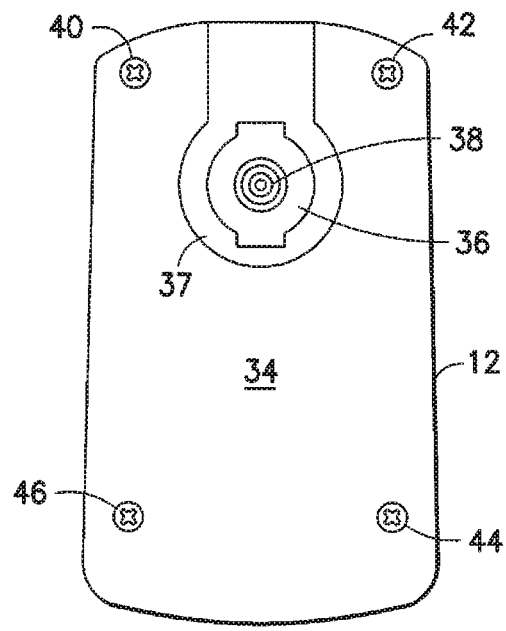
FIG._2

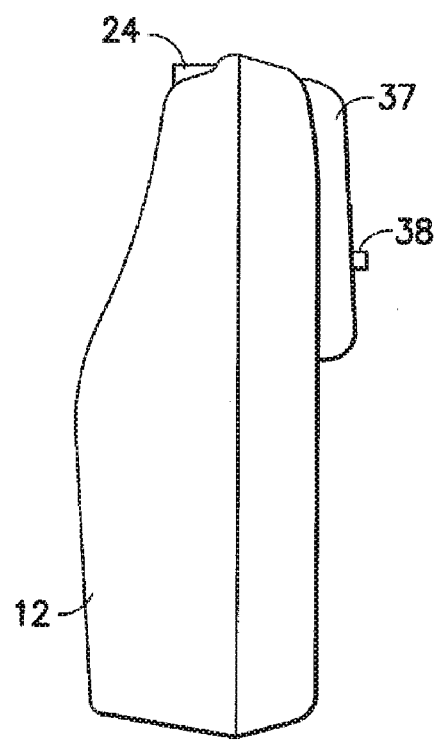
FIG._3
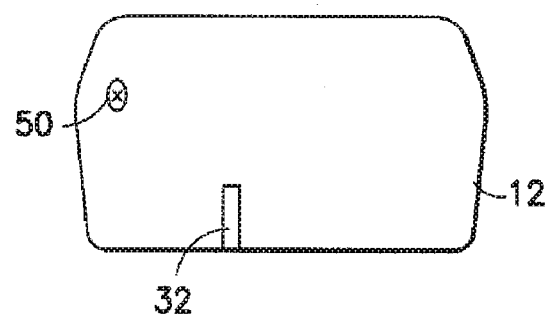
FIG._4

MULTI-FUNCTION DOCKING ASSEMBLY FOR PORTABLE DIGITAL MEDIA STORAGE AND PLAYBACK DEVICE

STATEMENT OF RELATED APPLICATIONS

This application claims benefit of U.S. patent application Ser. No. 10/197,367, filed on Jul. 17, 2002 and now issued as U.S. Pat. No. 6,591,085; of U.S. patent application Ser. No. 10/615,108, filed on Jul. 8, 2003 and now published as United States Patent Application Publication No. 2004/0058649; and of U.S. Provisional Patent Application Ser. No. 60/734,058, filed on Nov. 7, 2005. The disclosures of the foregoing applications and patents are hereby incorporated herein in their respective entireties. Priority of such applications is hereby claimed under the provisions of 35 U.S.C. 120 and/or 35 U.S.C. 119(e).

FIELD OF THE INVENTION

The present invention relates to accessories adapted for use with a portable digital media storage and playback device having a storage medium adapted to receive and store digital media files (such as, for example, MP3 (i.e., MPEG-1 audio layer 3) audio, WMA (Windows Media Audio) audio, MPEG-4 multimedia, and QuickTime multimedia files). More specifically, the invention relates to a multi-function docking assembly including signal transmission, power supply and/or charging, and authentication capability for such digital media storage and playback devices, and methods for broadcasting signals from a portable digital media storage and playback device coupled to a multi-function docking assembly.

DESCRIPTION OF THE RELATED ART

Media players of various types are ubiquitous throughout the world, and have evolved through various forms over the years, from portable single transistor radios in the 1950's to tape cassette players, to compact disc players, and more recently to portable digital media storage and playback devices that enable a user to obtain digital media files (e.g., by download from an Internet site) and store same in storage medium of a player in any of various preferably compressed formats for subsequent selective playback.

Preferred digital media storage and playback devices utilize hard drives and/or flash memory to store digital media files. A number of digital media storage and playback devices have been developed and are commercially available, including: the iPod® family of products manufactured by Apple Computer, Inc.; the iRiver® family of products manufactured by iRiver Inc.; the Nomad™, Zen™ and MuVo® families of products manufactured by Creative Technology, Ltd.; the Rio® family of products manufactured by Digital Networks North America, Inc.; the DJ™ family of products manufactured by Dell Computer, Inc.; the Lyra® family of products manufactured by RCA/Thomson Multimedia, Inc.; and the Yepp'® and neXus™ families of products manufactured by Samsung Electronics Co., Ltd. Such devices having varying capacities but models permitting the storage of approximately 1000 or more commercial play length audio files are commonplace. Certain models having sophisticated displays are further able to store and playback image and/or video files.

Media storage and playback devices of the aforementioned type rely on batteries for their portability, and are typically provided with a headset for user listening.

One problem associated with the small size and light-weight characteristics of portable digital media storage and playback ("PDMSP") devices, as requisite to their portability and ease of use, is battery life. Another problem is the personal character of the headphone-equipped PDMSP devices. A PDMSP device may be equipped with a speaker, but its small size and light-weight characteristics limit the size of the speaker, and small battery size would limit speaker output, making a speaker-equipped PDMSP device it less than desirable when a user seeks to transmit music from the same to a group of persons.

Various accessories have been developed for use with PDMSP devices. For manufacturers and purchasers of PDMSP devices, it would be desirable to ensure and/or regulate interoperability between such devices and accessories intended to connect therewith. For example, the original equipment manufacturer (OEM) of a PDMSP device may wish to avoid warranty claims and/or reputational damage that might result due to operating problems or hardware failures (e.g., inferior sound quality, battery overcharging, etc.) when the PDMSP device is connected with an accessory device of questionable quality sourced by a supplier of unknown repute. It may be difficult for an end user to determine the quality of an accessory device without making a purchase and possibly learning the hard way. Additionally, or alternatively, the PDMSP device OEM may wish to regulate the interoperability of accessories with the PDMSP device to derive additional revenue by producing accessories itself or by licensing to third parties for value the right to produce such accessories. Using and regulating by license the availability to preferred third party accessory manufacturers of proprietary components such as connectors can provide some degree of control to PSMSP device OEMs in this regard; however, such a strategy may be circumvented with relative ease by unlicensed parties with relative ease since such connectors may be readily copied.

Accordingly, there exists a need for accessories capable of interoperating with and expanding the functionality of portable digital media storage and playback devices.

SUMMARY OF THE INVENTION

The present invention relates in one aspect to a docking assembly electrically coupleable with a portable digital media storage and playback device, the assembly comprising:
  a body adapted to receive and retain the portable digital media storage and playback device;
  at least one electrical coupling associated with the body and adapted to engage the portable digital media storage and playback device when the portable digital media storage and playback device is received by the body;
  a transmitter connectable with the portable digital media storage and playback device via the at least one electrical coupling and adapted to wirelessly transmit media content from the portable digital media storage and playback device to an external receiving device;
  at least one electrical circuit element adapted to conduct power from an external power source to the at least one electrical coupling; and
  an authentication element adapted to provide an authentication signal to the portable digital media storage and playback device.

In another aspect, the present invention relates to a method for broadcasting signals from the portable media storage and playback device to an external receiving device, the method comprising the steps of:

providing the above-described docking assembly;
joining the docking assembly and the portable digital media storage and playback device in a single step of depressing at least a portion of the portable digital media storage and playback device into or against the body to simultaneously engage the at least one electrical coupling;
performing an authentication step including communicating an authentication signal between the authentication element and the portable digital media storage and playback device; and
wirelessly transmitting a signal including media content played by the portable digital media storage and playback device.

In another aspect, the present invention relates to a docking assembly electrically coupleable with a portable digital media storage and playback device, the assembly comprising:
a cavity-defining body adapted to receive and retain the portable digital media storage and playback device;
at least one electrical coupling disposed in the cavity and adapted to engage the portable digital media storage and playback device when the portable digital media storage and playback device is received by the body;
a transmitter connectable with the portable digital media storage and playback device via the at least one electrical coupling and adapted to wirelessly transmit media content from the portable digital media storage and playback device to an external receiving device;
at least one electrical circuit element adapted to conduct power from an external power source through the at least one electrical coupling to the portable digital media storage and playback device; and
an authentication element adapted to provide an authentication signal to the portable digital media storage and playback device.

In yet another aspect, the present invention relates to a method for broadcasting signals from a portable digital media storage and playback device to an external receiving device, the method comprising the steps of:
providing the above-described docking assembly;
joining the docking assembly and the portable digital media storage and playback device in a single step of depressing at least a portion of the portable digital media storage and playback device into or against the body to simultaneously engage the at least one electrical coupling;
performing an authentication step including communicating an authentication signal between the authentication element and the portable digital media storage and playback device; and
wirelessly transmitting a signal including media content played by the portable digital media storage and playback device.

In still another aspect, the present invention relates to a method for broadcasting signals from a portable digital media storage and playback device to an external receiving device, the method comprising the steps of:
providing a multi-function docking assembly comprising:
a body adapted to receive and retain at least a portion of a portable digital media storage and playback device;
at least one electrical coupling disposed in or on the cavity and adapted to engage the portable digital media storage and playback device when the portable digital media storage and playback device is received by the body;
a transmitter connectable with the portable digital media storage and playback device via the at least one electrical coupling and adapted to wirelessly transmit media content from the portable digital media storage and playback device to an external receiving device;
at least one electrical circuit element adapted to conduct power from an external power source to the at least one electrical coupling; and
an authentication element adapted to provide an authentication signal to the portable digital media storage and playback device;
joining the docking assembly and the portable digital media storage and playback device to engage the at least one electrical coupling;
performing an authentication step including communicating an authentication signal between the authentication element and the portable digital media storage and playback device; and
wirelessly transmitting a signal including media content played by the portable digital media storage and playback device.

In another aspect, the present invention relates to a portable digital media storage and playback system comprising a docking assembly as previously described operatively coupled to a portable digital media storage and playback device.

Other aspects, features and embodiments of the invention will be more fully apparent from the ensuing disclosure and appended claims.

BRIEF DESCRIPTION OF THE DRAWINGS

FIG. 1 is a front elevation view of a multi-function docking assembly according to one embodiment of the present invention.

FIG. 2 is a rear elevation view of the multi-function docking assembly of FIG. 1.

FIG. 3 is a right-hand side view, in elevation, of the assembly of FIGS. 1-2.

FIG. 4 is a bottom plan view of the assembly of FIGS. 1-3.

DETAILED DESCRIPTION OF THE INVENTION, AND PREFERRED EMBODIMENTS THEREOF

Figure 5:
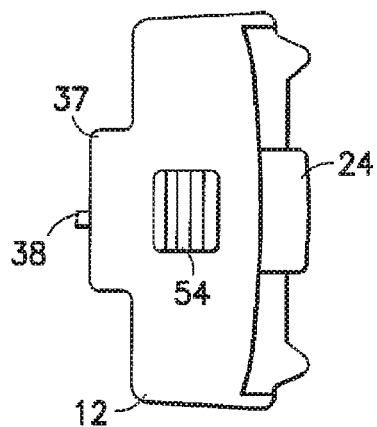
FIG. 5 is a top plan view of the assembly of FIGS. 1-4.

The present invention provides a multi-function docking assembly for a portable digital media storage and playback device that dramatically increases the utility of the basic portable digital media storage and playback (PDMSP) device. A docking assembly according to the present invention preferably provides device retention, wireless signal transmission, power supply and/or handling utility, and authentication utility to ensure that the docking assembly is interoperable with an associated PDMSP device.

A signal transmitter utilized in a docking assembly according to the present invention preferably comprises a radio frequency (RF) transmitter adapted to transmit at any of various RF frequencies a signal including media content played by the PDMSP device, enabling RF reception of media content signals that then can be received and played by an external receiving device. Preferred RF frequencies in one embodiment include FM signals in a range of preferably from about 87.5 to about 108 MHz. Operable RF frequencies in another embodiment include a range from about 800 MHz to about 10 GHz. In another embodiment, the wireless transmitter may transmit a signal compatible with a wireless network, such as an IEEE 802.16-compliant (WiMax) network, IEEE 802.11-complaint (Wi-Fi) network, an IEEE 802.15.1-compliant (Bluetooth) network, or similar or equivalent networks. Other frequency ranges or communication standards may be used where desired or appropriate. Examples of external receiving devices for use with docking assemblies according to the present invention include, but are not limited to, a FM radio receiver in a vehicle, a FM radio receiver in reception range of the transmitter, a wireless fidelity (WiFi) enabled personal computer or personal digital assistant, a mobile telephone, and a wireless video receiving device. Wireless signals may be intended for local-area or extended-area broadcast.

If desired, a wireless receiver (not shown) may be provided, and preferably integrated with the wireless transmitter 549 to form a transceiver adapted for two-way network communication.

In one example, a multi-function docking assembly including a FM transmitter, an electrical circuit element for providing power supply and/or charging utility, and an authentication element may be deployed in an automobile or other vehicular environment, wherein the docking assembly is powered by a power adaptor plugged into a cigarette lighter socket of the vehicle. The FM transmitter then transmits music signals originated by the PDMSP device to the FM receiver in the vehicle, enabling the acoustic system of the vehicle to be employed for broadcast of the music to the interior passenger compartment of the vehicle.

A multi-function docking assembly may as hereinafter described more fully comprise an AC charger enabling the battery of the PDMSP device to be recharged to a more fully charged state allowing its use period to be lengthened while on battery power.

The multi-function docking assembly may be provided in a kit including a base docking unit and various adaptor/charger/mount accessories, as hereinafter described.

Although the ensuing discussion is directed to an embodiment having specific use and applicability to an iPod® PDMSP device, it will be recognized that the utility of the invention is not thus limited, but rather extends to and encompasses other PDMSP devices. Accordingly, although an early-generation iPod® PDMSP device may utilize a Firewire® (IEEE 1394) port for power connection purposes, other types of port and electrical connection means may be employed. For example, more recently-released iPod® PDMSP devices employ 30-pin couplings.

Referring now to the drawings, FIG. 1 shows a front elevation view of a multi-function docking assembly 10 having a main body portion 12 including a back wall whose surface 14 together with side rails 18 and 20 define a cavity in which a PDMSP device is selectively reposable, received, and retained. Various components may be integrated into the main body portion 12. In one embodiment, a connector adapted for connection with a PDMSP device is provide separately (e.g., connected by a cable) from a main body housing various components.

As shown in FIG. 1, the multi-function docking assembly is provided with a male connector element 26 matably engagable with the headphone port of the PDMSP device, as well as a coupling 28 matably engagable with the Firewire® port of the PDMSP device. The coupling 28 preferably comprises multiple (more preferably at least about ten, and still more preferably at least about thirty) discrete electrically conductive contact elements.

In one embodiment, a signal transmitter is disposed substantially within the body portion 12 of the multi-function docking assembly to transmit media content played through the PDMSP device to a range of RF (e.g., FM) frequencies. The signal transmitter may be of any suitable type, and operates to transmit media content to an external receiver disposed in signal receiving proximity to the multi-function docking assembly and PDMSP device docked therein.

The signal transmitter may for example be provided having a tuning frequency in the FM band of 87.5 to 108.1 megahertz (MHz) and a transmission range of 4-6 feet or more. Stereo transmitters of such type are readily commercially available, and are of appropriate size for incorporation in a multi-function docking assembly.

A FM transmitter may simply transmit at a frequency fixed in the aforementioned 88-95 MHz band, or the transmitter may be tunable to select a specific frequency within such spectrum, preferably including at least one frequency generally in a range including about 88 MHz to about 108 MHz.

In operation of such an embodiment, an external FM receiver receives the transmitted audio from the PDMSP device transmitted by the multi-function docking assembly, and the FM receiver (e.g., located in a user's automobile) is then able to receive (e.g., by tuning the FM receiver to the frequency used by the transmitter in the multi-function docking assembly), amplify, and reproduce via the vehicular sound system the audio content as audible sound in the automobile passenger cabin.

The interior of the body or housing of a multi-function docking assembly preferably also includes circuitry and components for charging the battery of the PDMSP device, through the Firewire® port or other (e.g., USB) input port, as well as providing power to the PDMSP device when docked in the multi-function docking assembly.

As shown in FIG. 1, the multi-function docking assembly has on a lower portion 22 thereof indicator lights 30 and 32, which are configured for indicating when the PDMSP device is charging or fully charged, and/or when the PDMSP device is "ON."

The multi-function docking assembly may also be provided with an ON/OFF switch, for selectively actuating the PDMSP device, controlling the charging function of the multi-function docking assembly, etc.

FIG. 2 is a rear elevation view of a multi-function docking assembly, showing the back wall surface 34, on which is provided a boss 37 forming a coupling cavity 36 including a power connector element 38. The housing of the multi-function docking assembly may be of a 2-piece construction, with mechanical fastener elements 40, 42, 44 and 46 serving to couple the respective parts of the assembly. Various parts of the multi-function docking assembly may be removably coupled using these mechanical fasteners 40, 42, 44, and 46, or by any other appropriate means. Alternatively, the multi-function docking assembly may be formed of a unitary molded material, having a port or opening therein for insertion and assembly of the interior components, including circuitry and components as described hereinabove.

FIG. 3 is a right-hand side elevation view of the multi-function docking assembly, showing the retention member 24 at the upper portion of the housing. FIG. 4 is a bottom plan view of the multi-function docking assembly, including a further mechanical fastener 50 for retaining interior assembly elements of the assembly.

FIG. 5 is a top plan view of the multi-function docking assembly, showing the retention member 24, which is selectively disengagable by thumb-actuatable release member 54.

Figure 6:
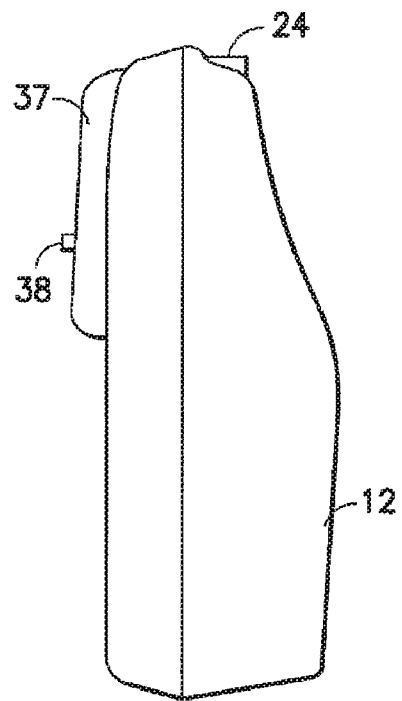
FIG. 6 is a left-hand side view, in elevation, of the assembly of FIGS. 1-5.

FIG. 6 is a left-hand side elevation view of the multi-function docking assembly, showing the symmetrical character of same relative to the view illustrated in FIG. 3.

Figure 7:
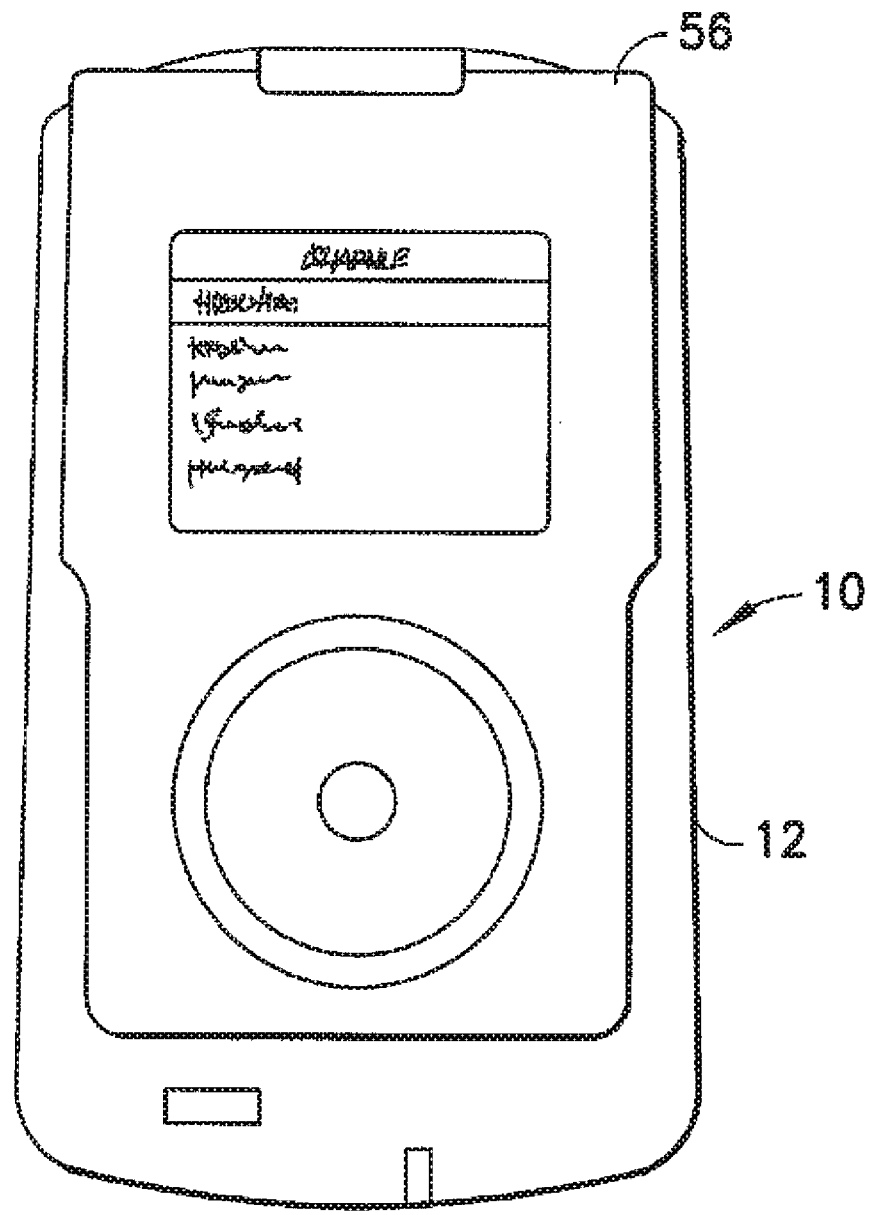
FIG. 7 is a front elevation view of the multi-function docking assembly of FIGS. 1-6, with a portable digital media storage and playback device docked and retained therein.

FIG. 7 illustrates the FM transmitter and power supply/charging assembly 10 having a PDMSP device 56 disposed in the cavity of the body 12 and communicatively coupled to the assembly 10 via the connector element 26 and coupling 28.

Figure 8:
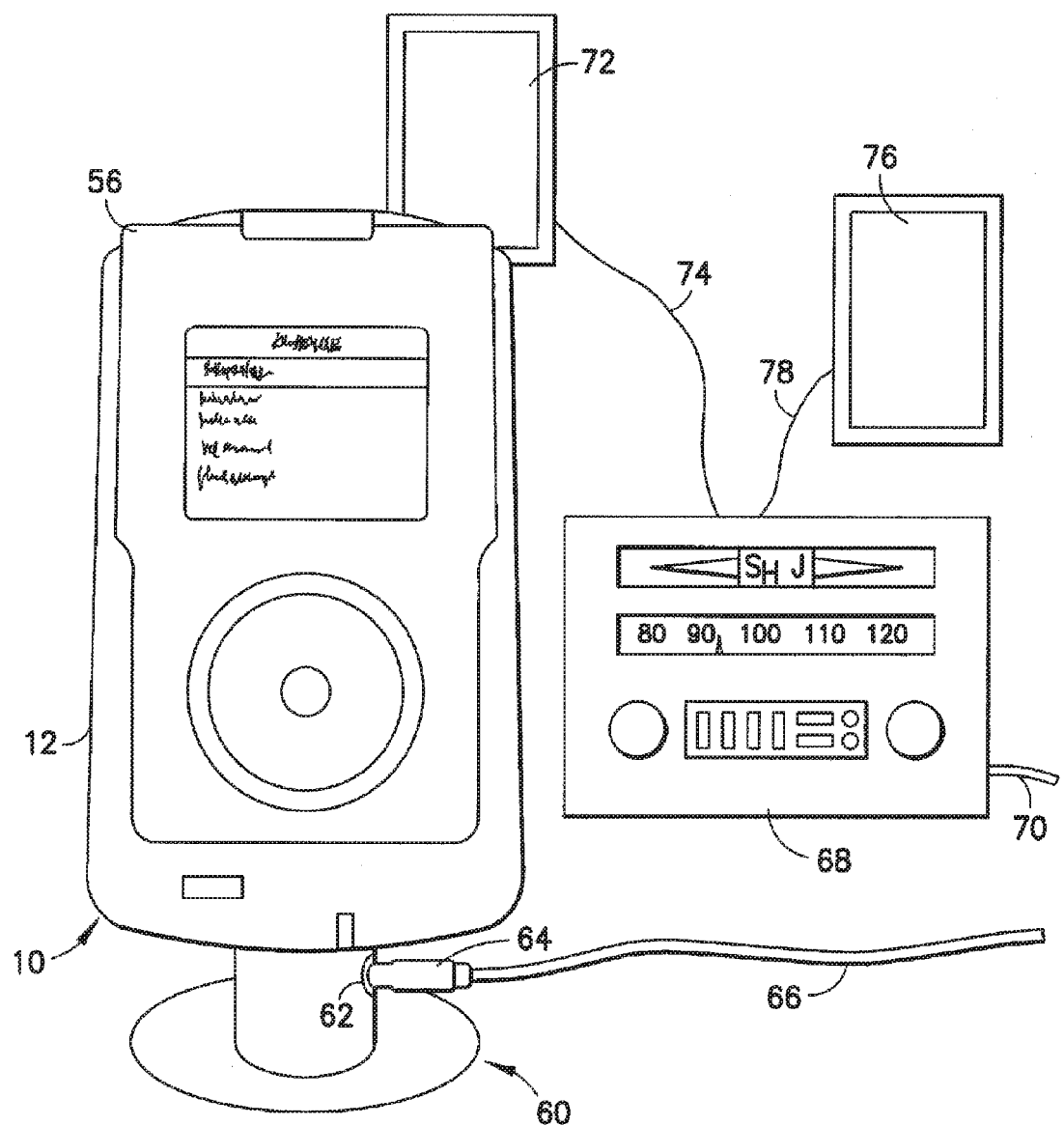
FIG. 8 is a schematic representation of a media system including a multi-function docking assembly of the invention, having a portable digital media storage and playback device docked and retained therein, and arranged in transmitting relationship to an external receiver having audio speakers attached thereto.

FIG. 8 is a corresponding view of PDMSP device 56 mounted in the body 12 of the FM transmitter and power supply/charging assembly 10. In this configuration, the multi-function docking assembly is mounted on a pedestal 60 having an arm extending upwardly at the rear of the multi-function docking assembly and coupling with the power element 38 on boss 37 (see FIGS. 2, 3 and 6). The pedestal 60 is provided with an electrical coupling 62 accommodating power plug 64 connected to power cord 66, providing power to the pedestal 60 for transmittal through contact 38 to the PDMSP device by element 28, as shown in FIG. 1.

When the PDMSP device is actuated to play the stored audio content, the corresponding signal is transmitted through coupling element 26 shown in FIG. 1 to the FM transmitter in the housing of the multi-function docking assembly, generating an FM signal that is transmitted to FM receiver 68 powered by power cord 70. The FM receiver 68 in turn is coupled by speaker wires 74 and 78 to speakers 72 and 76, respectively. In such manner, the audio content played by the PDMSP device 56 is transmitted by the FM transmitter to FM receiver 68 and outputted as sound output at speakers 72 and 76.

Concurrently, the PDMSP device can be electrically charged to renew the battery power of the device, so that when undocked from the multi-function docking assembly, the PDMSP device may be outfitted with earphones and deployed in a personal listening arrangement.

Although the FIG. 8 embodiment is shown as including a table-type FM receiver, it will be recognized that the arrangement is illustrative only, and is adaptable to automotive or vehicular sound systems including an FM receiver or a receiver of another suitable type.

The multi-function docking assembly as shown in FIGS. 1-6 may be coupled with a power source in any suitable manner.

Figure 9:
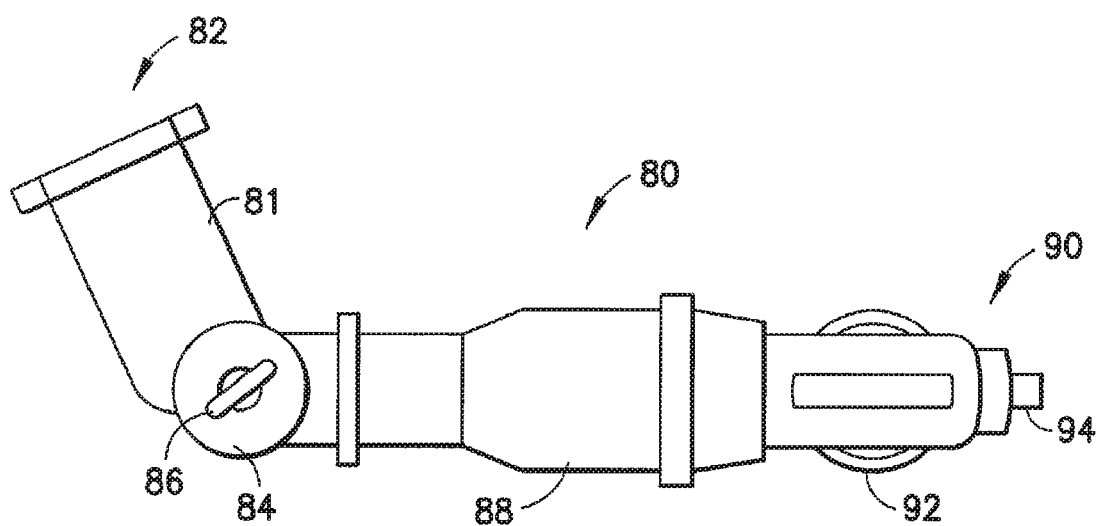
FIG. 9 is a pivotably adjustable ratchet adaptor, which is coupleable with a cigarette lighter power socket, e.g., a conventional 12 volt socket connected to the battery system and/or charging system of a motor vehicle, wherein the outer coupling end of the adaptor is engagable with the port on the rear face of the multi-function docking assembly, with the ratchet arm being pivotably adjustable to spatially position the portable digital media storage and playback device at a given orientation relative to a user.

FIG. 9 shows a ratchet-type adaptor 80 including engagement structure 82 matable with the cavity 36 shown in FIG. 2 on the multi-function docking assembly. The coupling structure 82 is at the face of tubular member 81 which is pivotably mounted on spindle 84 which is positionable by means of the manual wing-nut 86, which is selectively manually tightenable or loosenable, to adjust the attitude of tubular member 81 relative to the main body 88 of the adaptor. The main body 88 is joined to a plug end 90 featuring electrical contact elements 92 and 94, for engagement of the plug end 90 with a corresponding socket, such as a cigarette lighter socket of a motor vehicle. Such an adjustable mounting structure permits the PDMSP device to be maintained in any of various desired spatial positions.

Figure 10:
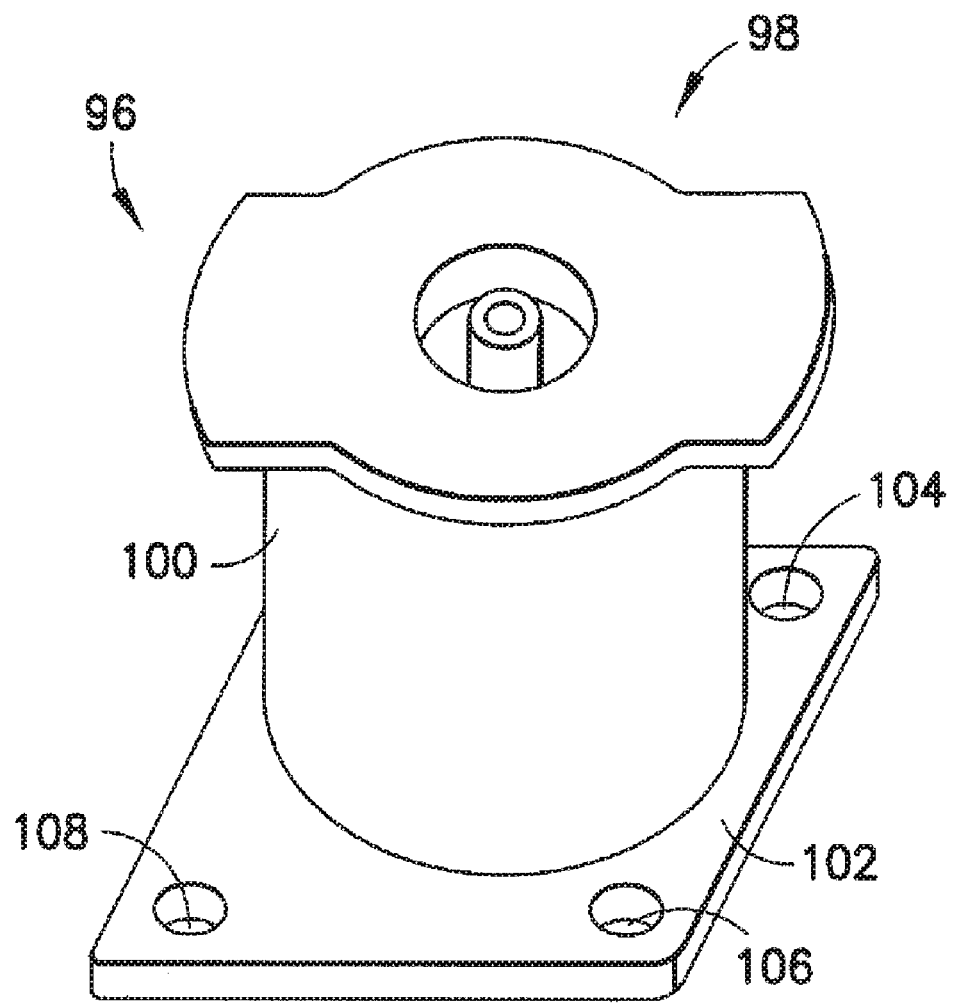
FIG. 10 is a short adaptor coupleable with the coupling structure on the rear face of the docking assembly of FIGS. 1-6, wherein the adaptor includes a wall mounting plate, accommodating wall mounting of the multi-function docking assembly.

FIG. 10 shows another adaptor 96 having engagement structure 98 at the extremity of cylindrical member 100 mounted on plate number 102. The engagement structure 98 is engagable with the cavity 37 at the rear face of the multi-function docking assembly (see FIG. 2).

The plate 102 shown in FIG. 10 is provided with mounting openings 104, 106 and 108, for wall-attachment of the adaptor, using mounting screws, nails, etc.

The adaptor shown in FIG. 10 permits the multi-function docking assembly to be wall-mounted, whereby the PDMSP device may be selectively docked and undocked from the wall-mounted multi-function docking assembly.

Figure 11:
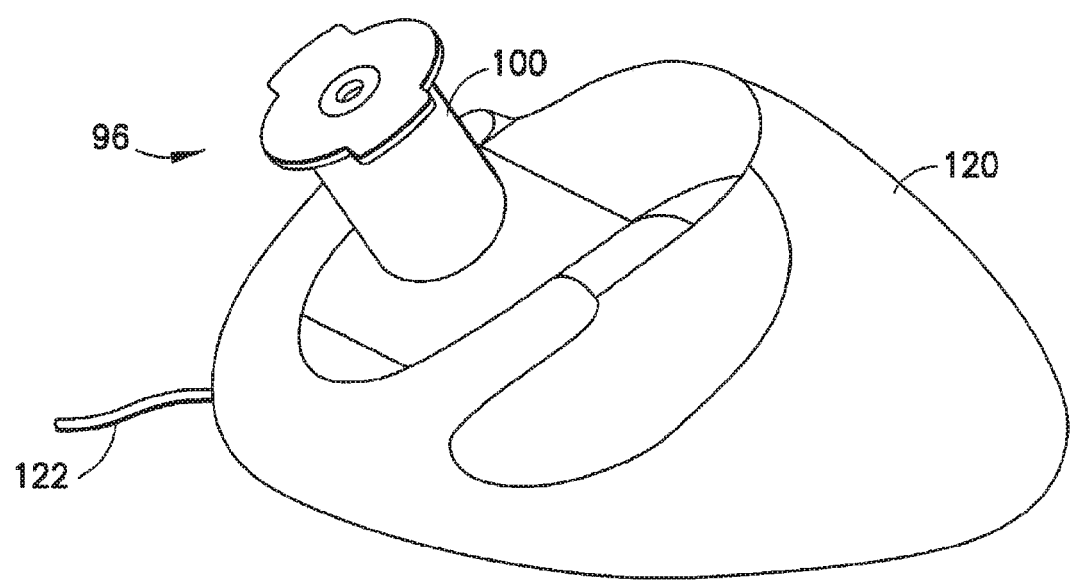
FIG. 11 is a desk mount device, in which the short adaptor of FIG. 10 may be reposed, to provide desktop access of a user to the portable digital media storage and playback device as reposed in the multi-function docking assembly coupled with the adaptor mounted on the desk mount article.

FIG. 11 is a perspective view of a desk mount article 120, in which the short adaptor 96 shown in FIG. 10 may be selectively reposed, or coupling with the desk mount article 120 joined to power cord 122.

The multi-function docking assembly as shown in FIGS. 1-6 may thereby be coupled with the adaptor 96 of the desk mount article by engagement of the engagement structure with the cavity 37 and electrical coupling 38 as shown in FIG. 2.

Figure 12:
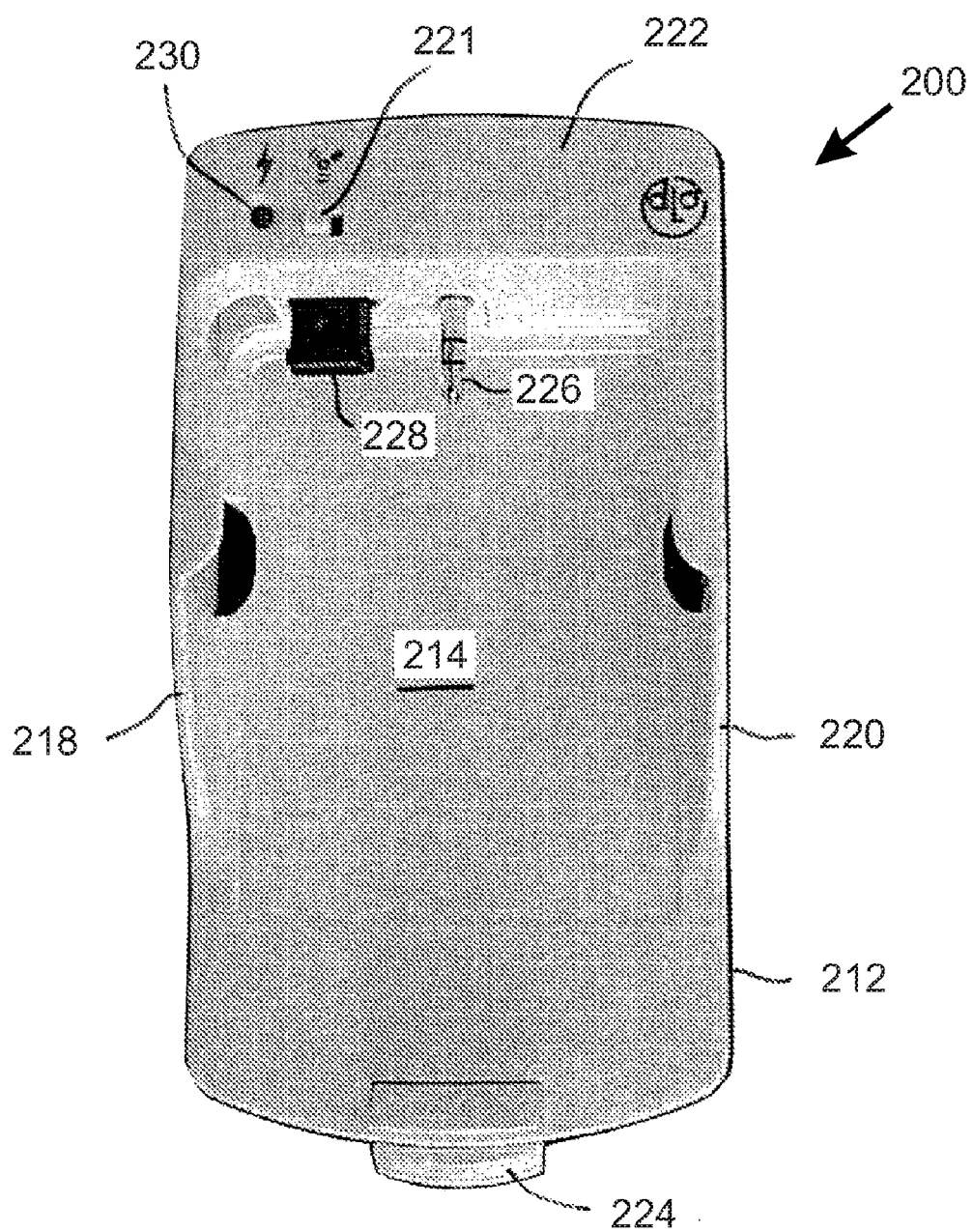
FIG. 12 is a front elevation view of a multi-function docking assembly according to another embodiment of the present invention.

FIG. 12 is a front elevation view of an FM transmitter and power supply/charging assembly 200, or multi-function docking assembly, according to another embodiment of the present invention.

The multi-function docking assembly 200 includes a main body portion 212 defining a cavity for selectively reposing the PDMSP device therein. The cavity is bounded by back wall 214 and side rails 218 and 220. Extending into the cavity is a male coupling or connector 226, which may serve to couple the multi-function docking assembly with the headphone jack of the PDMSP device, as well as a coupling 228 matably engagable with the Firewire® port of the PDMSP device. Such couplings 226, 228 engage PDMSP device when it is received by the docking assembly 200. Thus, the docking assembly 200 and PDMSP device may be joined in a single step of depressing at least a portion of the PDMSP device into or against the body to simultaneously engage the couplings 226, 228. The cavity as shown is also bounded by laterally inwardly facing elements, which serve as inwardly extending tabs on the respective side rails, to assist in retaining the PDMSP device in position in the cavity during media content play, storage or charging of the player.

On the upper portion 222 of the multi-function docking assembly 200 in the position shown, is provided an LED power indicator light 230, and a Firewire® port adjustment switch 221, which serves to laterally reposition the coupling 228 in the cavity, so that the coupling is placed in register with the Firewire® port of the PDMSP device.

On the lower portion of the multi-function docking assembly 200 in the position illustrated in FIG. 12, a retractable security shelf member 224 is provided. The shelf member 224 can be selectively manually adjusted to a forward position to assist in retaining the PDMSP device in the cavity of the docking assembly, so that the PDMSP device is positionally fixtured in the cavity of the multi-function docking assembly during use or charging of the PDMSP device.

In the ensuing FIGS. 13-17, all parts and structural features of the multi-function docking assembly are correspondingly numbered to the same parts and structural features as shown in FIG. 12, for ease of reference.

Figure 13:
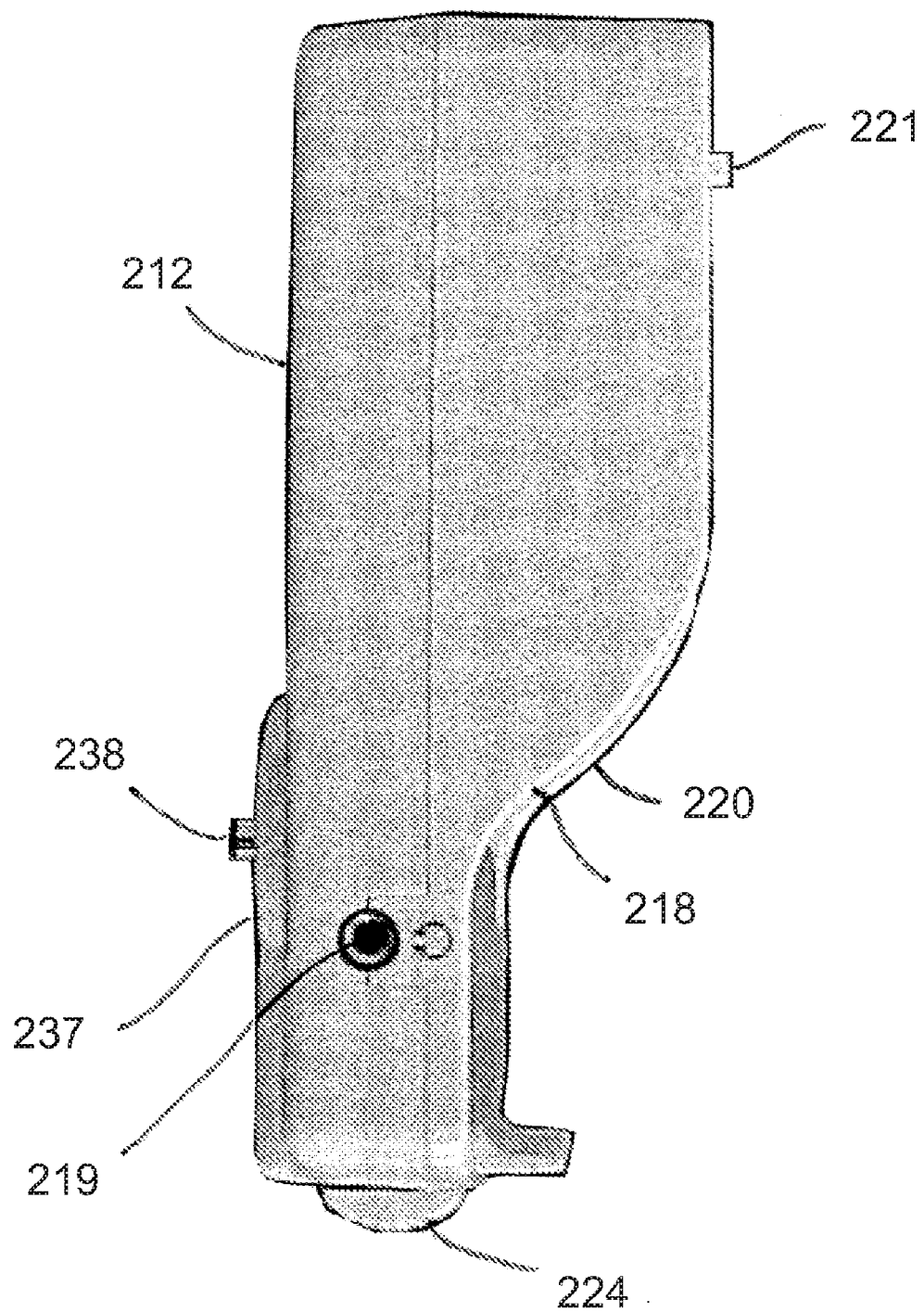
FIG. 13 is a left-hand side view, in elevation, of the docking assembly of FIG. 12.

FIG. 13 is a left-hand side view, in elevation, of the multi-function docking assembly 200 of FIG. 12, showing the boss 237 on the rear surface of the assembly and the protruding power connector element 238. A headphone jack 219 is provided on the side surface of the assembly, as shown, for selective use of the multi-function docking assembly in a headphones-engaged listening mode when a PDMSP device is mounted in the unit.

Figure 14:
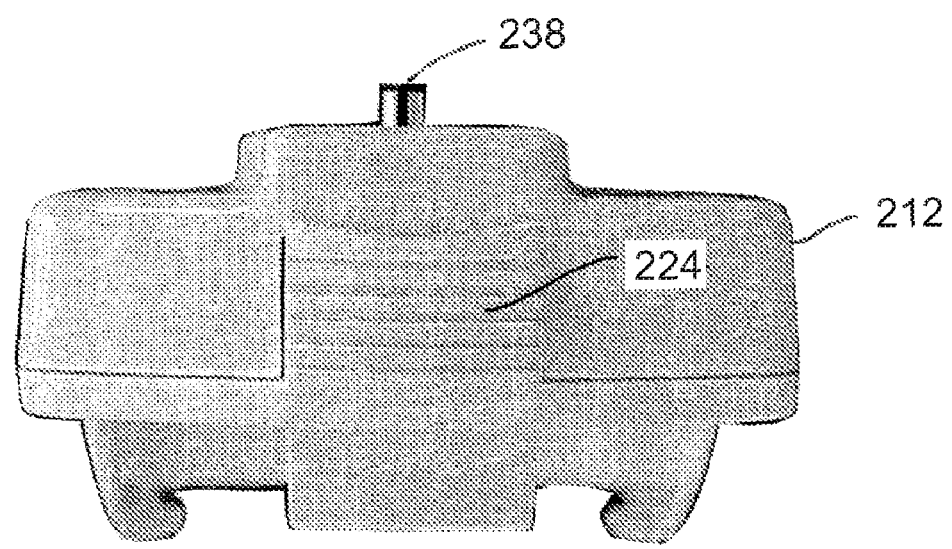
FIG. 14 is a bottom plan view of the docking assembly of FIGS. 12-13.

FIG. 14 is a bottom plan view of the multi-function docking assembly shown in FIG. 12, showing the retractable security shelf 224. The shelf member includes a ridged surface to facilitate engagement with the thumb or other digit of the user, in selectively extending the shelf forwardly to secure the PDMSP device in position, or alternatively to retract the shelf so that the PDMSP device can be removed from the multi-function docking assembly.

Figure 15:
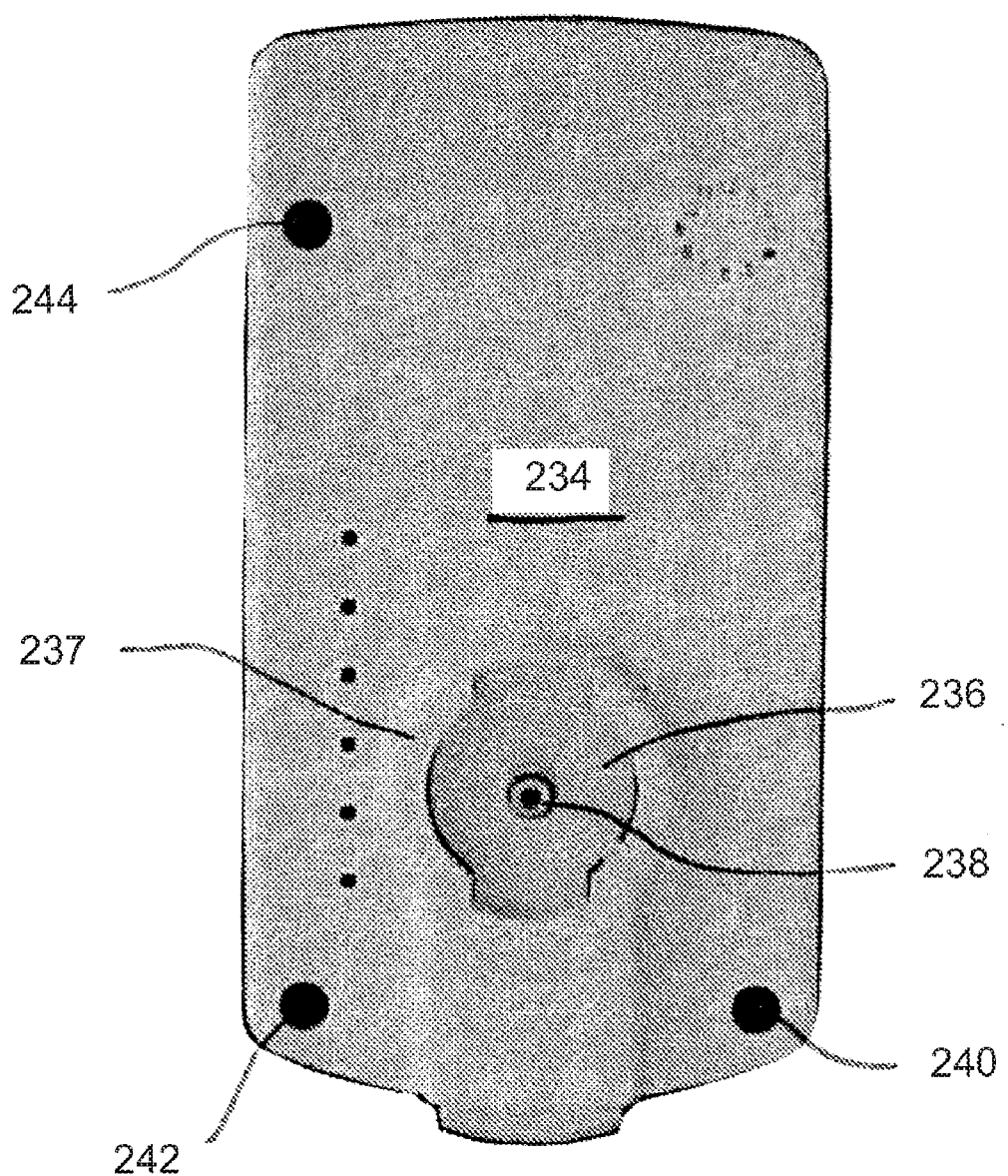
FIG. 15 is a rear elevation view of the docking assembly of FIGS. 12-14.

FIG. 15 is a rear elevation view of the multi-function docking assembly of FIG. 12, showing the boss 237 on the back wall surface 234. The boss 237 forms a coupling cavity 236 including the power connector element 238 therein. The housing of the multi-function docking assembly of this embodiment can be of two-piece (or more than two-piece) construction, wherein each of the front and back sections of the housing are secured to one another by means of mechanical fasteners 240, 242 and 244, as shown. The housing of the multi-function docking assembly may alternatively be formed of single-piece construction, or otherwise formed and fabricated in a suitable manner facilitating fabrication of the assembly.

Figure 16:
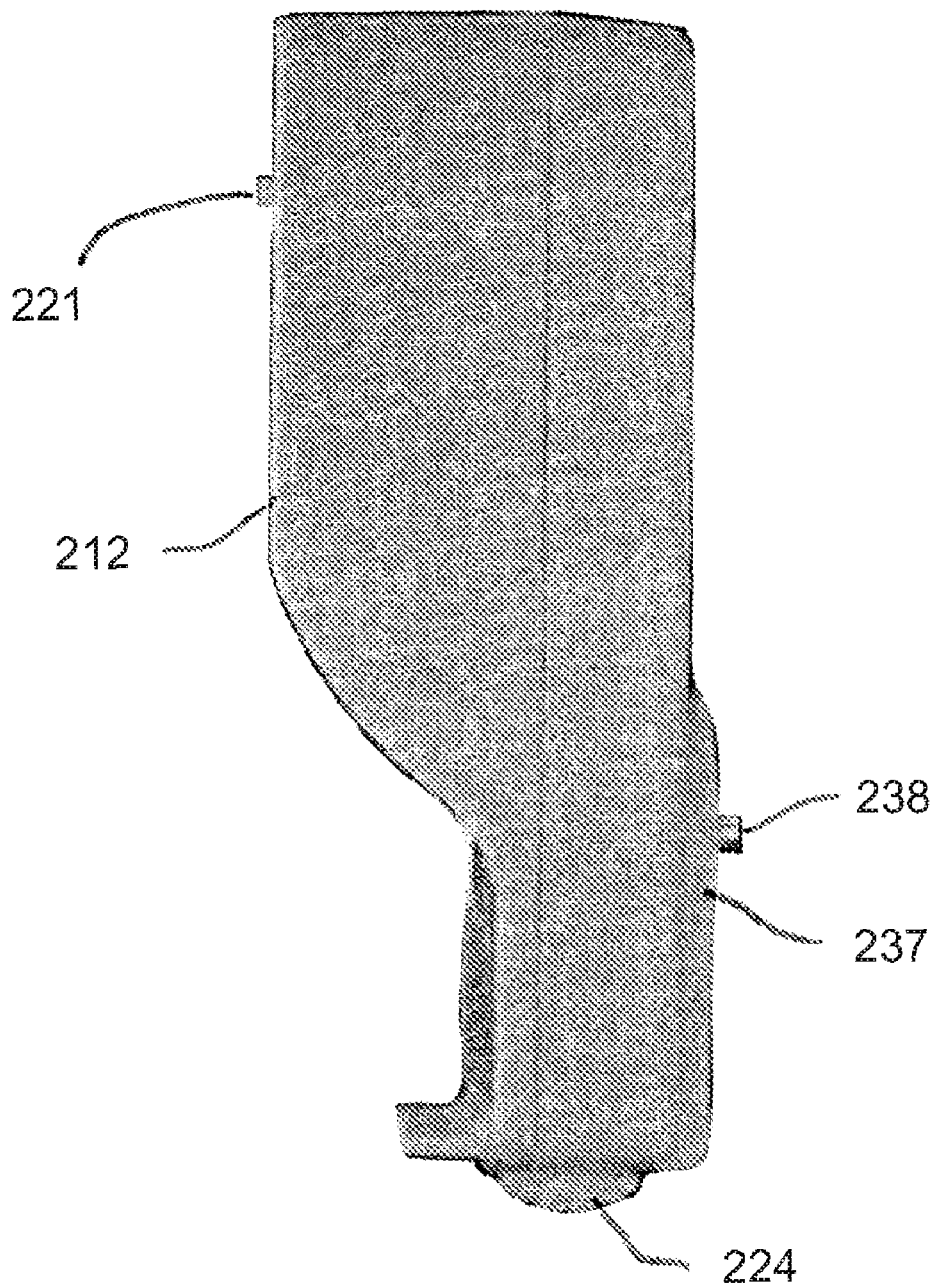
FIG. 16 is a right-hand side view, in elevation, of the assembly of FIGS. 12-15.

FIG. 16 is a right-hand side view, in elevation, of the assembly of FIG. 12, showing the boss 237 on the back wall surface and the power connector element 238 protruding therefrom. The retractable security shelf 224 is shown at the bottom of the assembly in the view illustrated, and the Firewire® port adjustment switch 221 is shown protruding from the upper end of the assembly.

Figure 17:
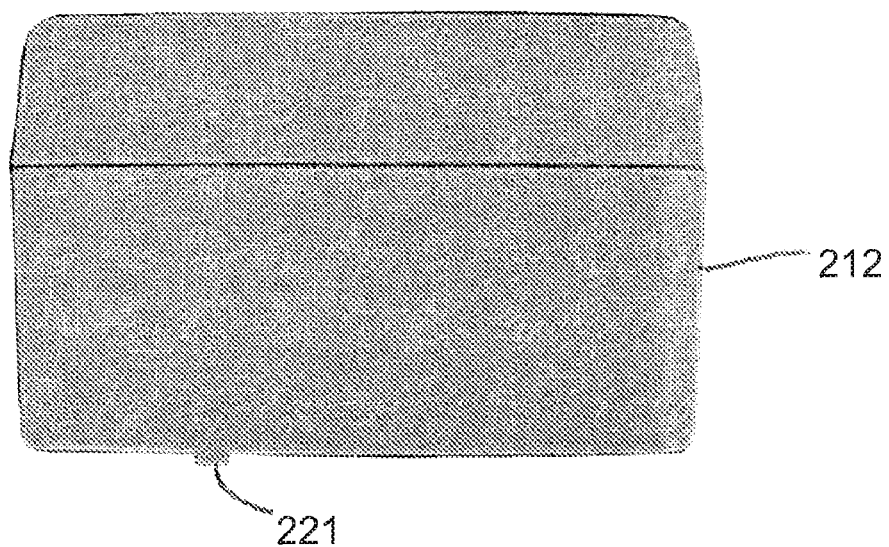
FIG. 17 is a top plan view of the multi-function docking assembly of FIGS. 12-16.

FIG. 17 is a top plan view of the multi-function docking assembly shown in FIG. 12, with the Firewire® port adjustment switch 221 protruding from the front surface of the main body portion 212 of the assembly.

Figure 18:
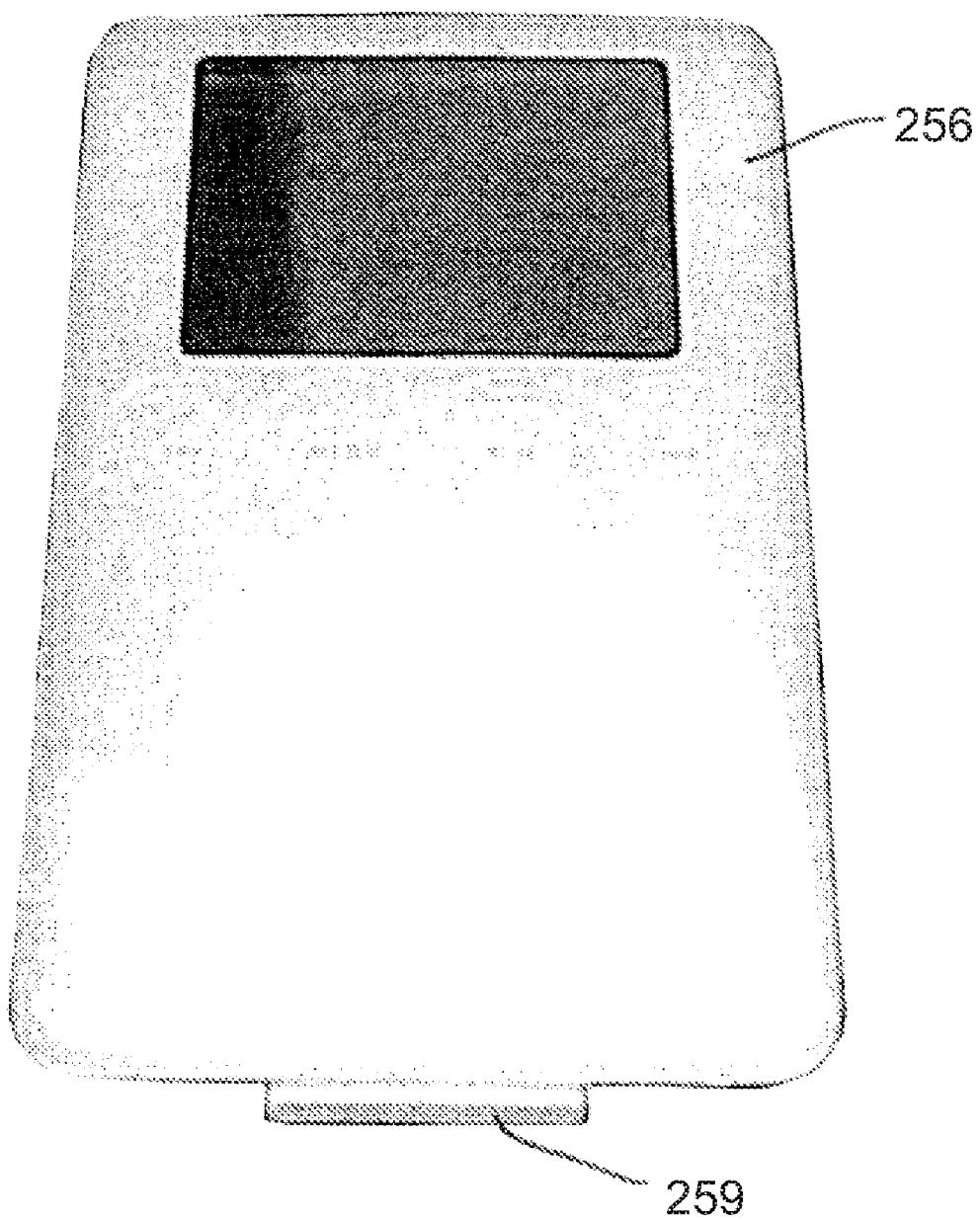
FIG. 18 is a perspective view of a portable digital media storage and playback device having a connector adapted for coupling with a Firewire® port or a USB port.

FIG. 18 is a perspective view of a PDMSP device 256 having a connector 259 adapted for docking with a Firewire® port or a USB port. The PDMSP device 256 illustrated in FIG. 18 is an iPod® PDMSP device, available from Apple Computer, Inc., Cupertino, Calif., although other PDMSP devices can be used with multi-function docking assemblies according to the present invention.

Figure 19:
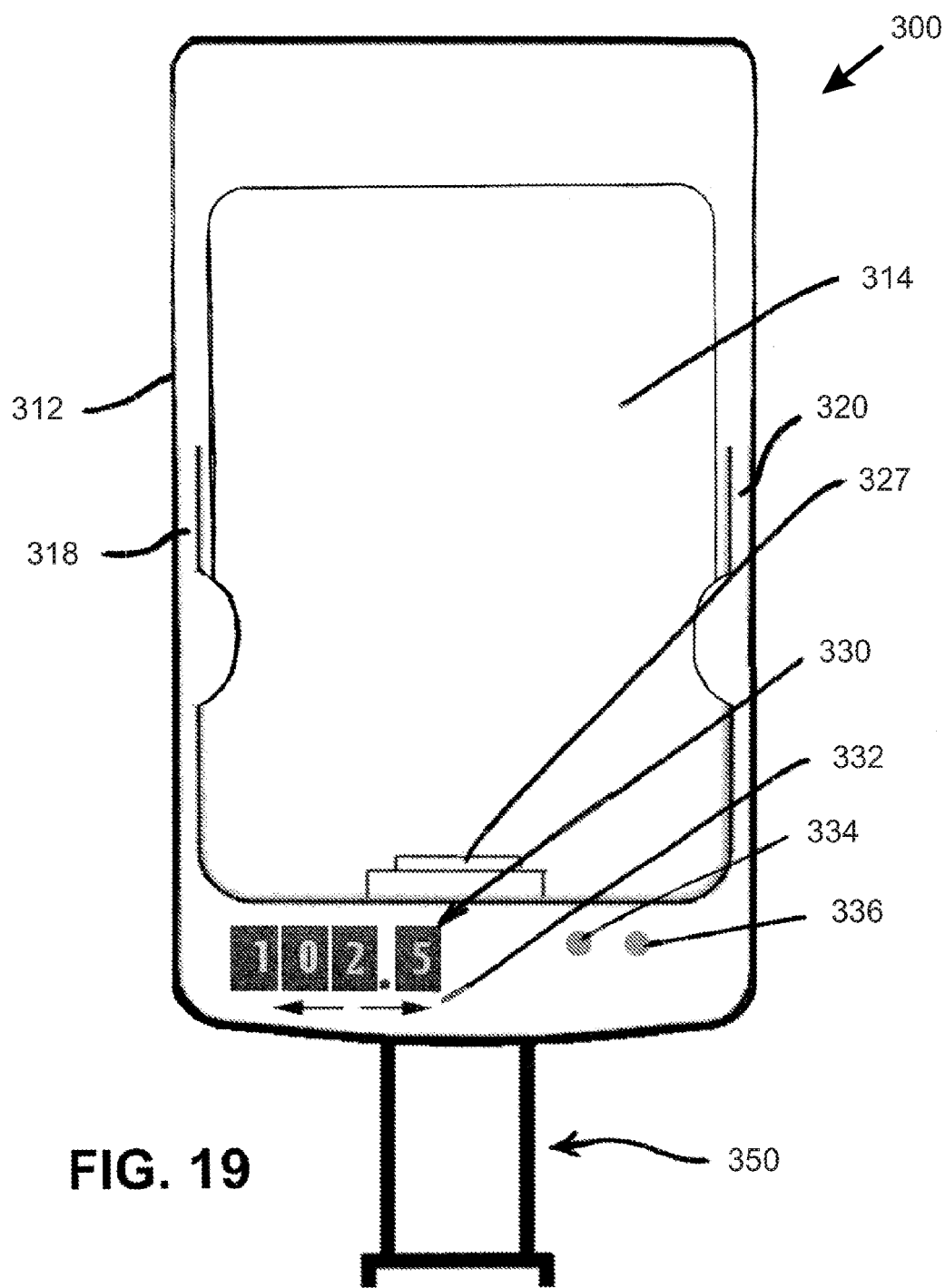
FIG. 19 is a schematic front elevation view of a multi-function docking assembly according to another embodiment of the invention, arranged for mounting therein of a portable digital media storage and playback device of the type shown in FIG. 18.

FIG. 19 is a schematic front elevation view of a multi-function docking assembly 300 according to another embodiment of the invention, arranged for mounting therein of a PDMSP device of the type shown in FIG. 18. The multi-function docking assembly 300 includes a housing 312 defining a cavity therein bounded by back wall surface 314 and the side rails 318 and 320 of the housing. At the bottom extremity of the cavity is positioned a dock connector 327 that mates with the connector 259 of the PDMSP device 256 (see FIG. 18).

The multi-function docking assembly 300 has on a lower portion of the housing, on a frontal surface thereof, a frequency indicator display 330, which in the drawing indicates a frequency of 102.5 megahertz (MHz) being transmitted by the transmitter in the docking assembly. Below the frequency indicator display is a tuning control 332, which can be variously configured as a membrane switch, as a thumb-wheel control, or other control member that is selectively actuatable to increase or decrease the transmitter frequency, as desired. Preferably the FM transmitter has selectively adjustable digital frequency tuning, and the frequency indicator display is a digital display adapted to display the transmission frequency to the user.

To the right of the frequency indicator display 327 on the lower portion of the housing 312 is a power indicator 334, which may comprise an LED or other suitable element indicating the power "ON" or "OFF" status of the assembly. Adjacent to the power indicator 334 is an FM transmitter indicator element 336 which may likewise comprise an LED or other suitable element indicating the "ON" or "OFF" status of the FM transmitter disposed in the housing.

The multi-function docking assembly 300 of FIG. 19 is shown as coupled to a flexible 12-volt cigarette lighter adapter 350, to enable the assembly to be powered from the electrical system of a vehicle, by plug-in of the adapter 350 into the cigarette lighter of the vehicle. The connected multi-function docking assembly 300 then is situated to receive the PDMSP device in the cavity of the housing, and to be actuated to transmit audio from the PDMSP device to the sound system of the vehicle in which the multi-function docking assembly is mounted.

It will therefore be recognized that the FM transmitter and power supply/charging assembly of the present invention may be widely varied in specific structure, while providing FM transmission ability to the PDMSP device docked therein, and concurrently providing charging capability to the PDMSP device battery, as well as power during docked usage of the PDMSP device.

The various adaptors shown, as well as the associated mounting articles, may be provided as a kit together with the FM transmitter and power supply/charging assembly, to provide a package of alternative parts for varied deployment of the docked PDMSP device.

One way to ensure or regulate interoperability between an accessory device (such as a multi-function docking assembly) and a PDMSP device is through the use of authentication technology. In a preferred embodiment, a docking assembly and a PDMSP device each include an authentication element, such as an integrated circuit, adapted to communicate with one another to execute an authentication scheme employed at least the first time that the accessory device is connected to the PDMSP device, with successful authentication being a prerequisite for the transfer of any substantive content or control signals between the PDMSP and the accessory device. Preferably, a challenge and response-based authentication scheme is employed for the authentication scheme.

Examples of integrated circuits that may be used to provide or easily adapted to provide such functionality include: the Texas Instruments BQ26150-family of ICs (including models BQ26150DCKR and BQ26150DCKRG4) (Texas Instruments Inc., Dallas, Tex.); the Dallas Semiconductor/Maxim DS2703-family of ICs (including models DS2703U and DS2703U+)(Maxim Integrated Products, Sunnyvale, Calif.); and the Intersil ISL6296 family of ICs (Intersil Corp., Milpitas, Calif.).

Figure 20:
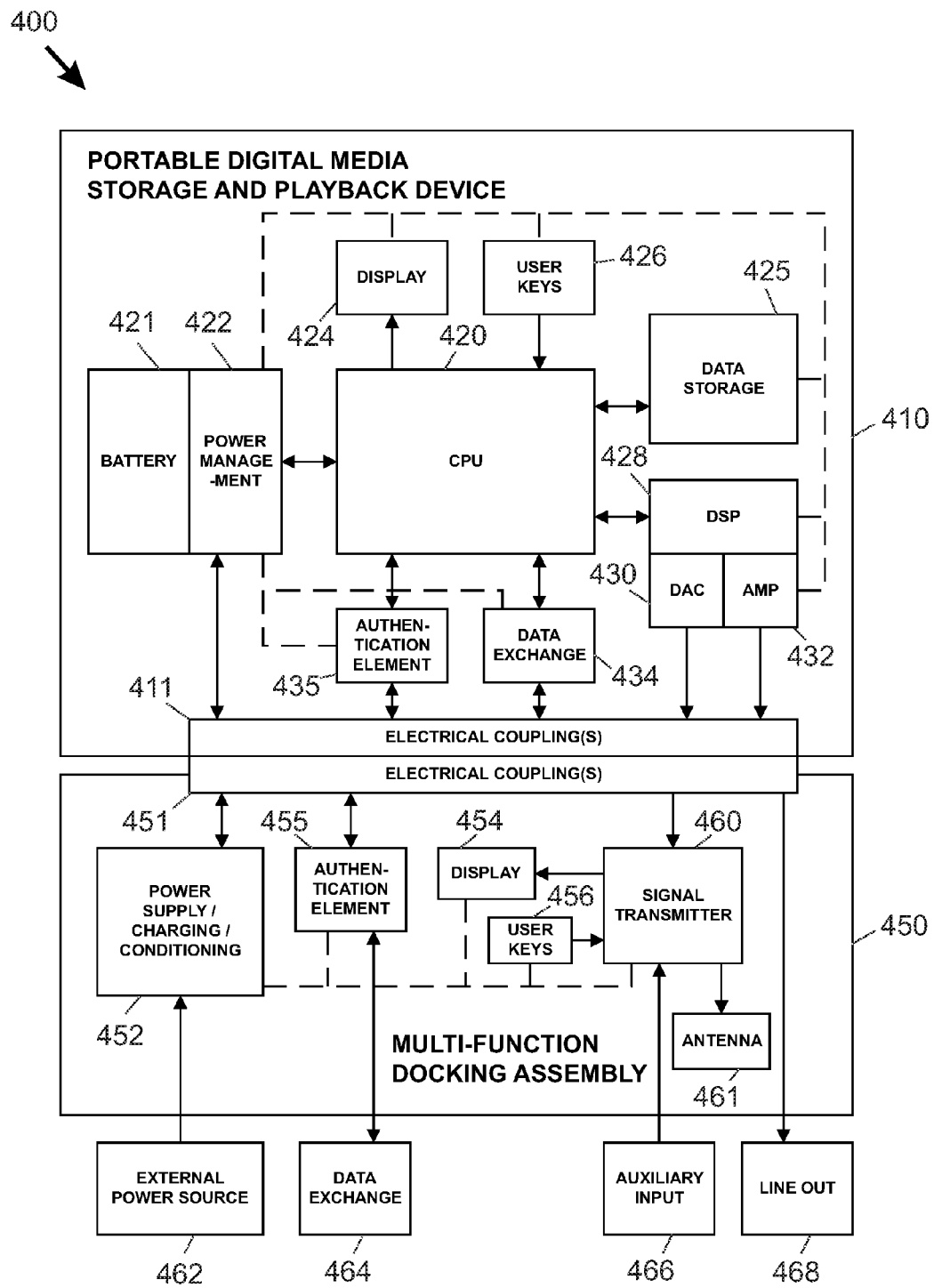
FIG. 20 is a block diagram showing the interconnection between various elements of a multi-function docking assembly and various elements of a portable digital media storage and playback device connected thereto, with each of the device and the assembly having an authentication element.

FIG. 20 provides a block diagram of a preferred coupled combination 400 of a PDMSP device 410 and a multi-function docking assembly 450 adapted to provide authentication utility. The docking assembly 450 includes at least one electrical interface coupling 451 that mates with a corresponding at least one electrical interface coupling 411 associated with the PDMSP device.

The PDMSP device includes a central processing unit or CPU 420 (such as a complex instruction set computer microcontroller) that interfaces with various other components. User keys 426 or other input elements may be used to communicate user commands to the CPU 420. A data storage element 425 utilizes any of a rotating disc (hard drive or microdrive) and flash memory to store various media files in addition to other data files and/or executable programs. A digital signal processor or DSP 428, which may be integrated into the CPU 420 if desired, may be used to execute postprocessing algorithms like equalization and bass management on files to be output, either directly through the digital-to-audio converter or DAC 430 as a line level output, or through the DAC 430 and a headphone amplifier 432 as an amplified output with volume control. A data exchange element 434, preferably including Universal Serial Bus (USB) or Firewire® (IEEE 1394) connectivity, may be used to transfer data to or from the data storage element 425. An authorization element 435, preferably including an integrated circuit, may be used to authenticate an accessory device such as a multi-function docking assembly 450. A display element 424, preferably including a high resolution LCD or LED display, may be provided to drive graphical user interface menus, play still images, and/or play video files. A battery 421 is in electrical communication with a power management element 422, which may provide DC-DC step-down conversion utility for various electronic elements of the PDMSP device, linear regulation utility for the audio amplifier 432, DC-DC boost conversion utility for the display element 424, synchronization boost conversion utility for the data exchange element 434 or other input/output elements, and charge regulation/AC charging utility for the battery 421.

The multi-function docking assembly 450 includes one or more power supply/charging/conditioning elements 452 to receive power from an external power source 462, condition the same for use by various elements within the docking assembly 452, and/or conduct power to the PDMSP device 410 by way of the coupled interface couplings 451, 411. The power supplied to the PSMSP device from the external power source by way of the one or more power supply/charging/conditioning elements 452 may be used to power the PDMSP device 410 and/or charge the battery 421 of the same. The docking assembly 450 further includes an authorization element 455 such as described previously. The authorization element 455 preferably comprises an integrated circuit and a memory, with the memory preferably including both a public memory for storing unencrypted communicable information and secret or encrypted information. The authorization element 455 is preferably reprogrammable, such as by way of connection to a data exchange (e.g., USB or other) port 464 that may be linked to an appropriate device such as a personal computer or PDA to accomplish reprogramming functions if desired. Such reprogramming utility may be desirable, for example, to enable use of the docking assembly 450 with new releases of PDMSP devices 410 having potentially new and different authentication data or authentication schemes as such new PDMSP devices may become available. If desired, the authorization element 455 may be integrated into a central microprocessor associated with the docking assembly 450.

As noted previously, the multi-function docking assembly 450 includes a signal transmitter 460 adapted to transmit at any of various, preferably RF and more preferably FM, frequencies a signal including media content received from the PDMSP device 410. A display 454 preferably comprising a digital frequency indicator display 454 is provided to display the transmission frequency of the signal transmitter 460, with the transmission frequency subject to user adjustment via user keys 456 or an equivalent user input device. A dedicated antenna 461 in electrical communication with the signal transmitter 460 may be optionally provided. Alternatively, any of various electrical elements associated with the docking assembly such as a power supply cord may be used to enhance the transmission of signals from the transmitter 460. The docking assembly 450 may further include a line level output connector 468 to communicate a media content signal to any of various auxiliary devices connectable to the docking assembly 450.

Figure 21:
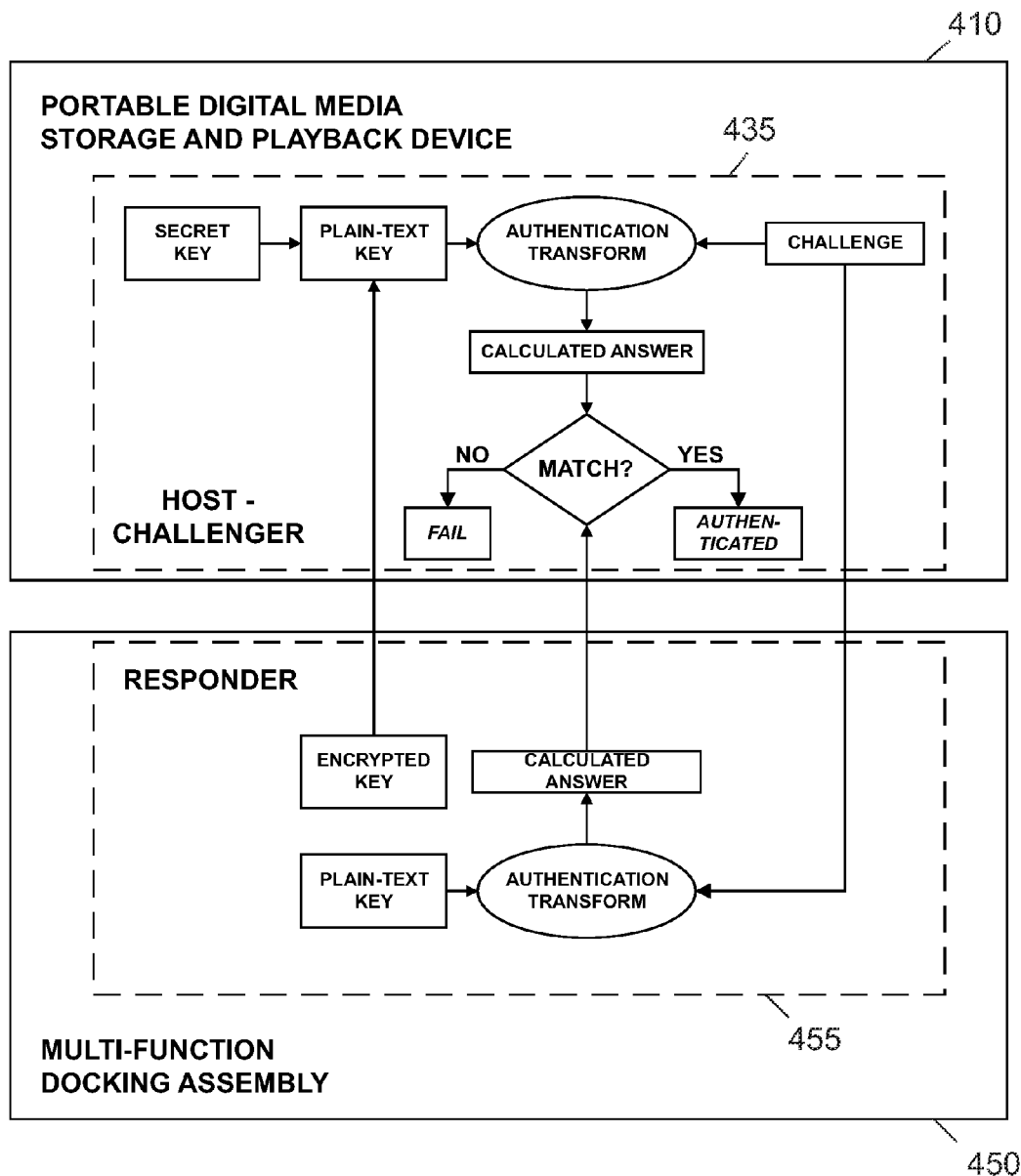
FIG. 21 is a functional block diagram for an authentication scheme that may be utilized by and between a multi-function docking assembly according to the present invention and a portable digital media storage and playback device.

FIG. 21 provides a functional block diagram for a basic challenge and response-based authentication scheme that may be utilized by and between a multi-function docking assembly 450 and a portable digital media storage and playback device 410. In a basic challenge and response scheme, the "host" or "challenger" (e.g., authentication element 435 associated with the PDMSP device 410) sends a random challenge to the "responder" (e.g., authentication element 455 associated with the docking assembly 450) upon initial connection between the two. A random challenge may consist of a number of bits of random data generated by the host. Each authentication element 435, 455 preferably includes a memory for storing certain authentication information, with the memory of at least the docking assembly authentication element 455 preferably being reprogrammable. The memory of each authentication element 435, 455 preferably includes both a private memory (e.g., for including unencrypted information and/or a secret key that is preferably not subject to transmission) and a public memory (e.g., for including encrypted information and/or a public key, unique device ID, or other less sensitive information). Using stored information, the responder 455 processes the host-transmitted challenge information (e.g., by performing an authentication transform or computation, preferably utilizing the secret key or some information derived therefrom such as a public key) to produce a response string for transmission back to the host 435. On the other side, the host 435 performs the same authentication transform using stored information, or some combination of stored information and information communicated by the responder (e.g., an encrypted key passed by the responder 455). The result compares the transform value computed by the host 435 against the response (transform value) obtained from the responder 455. If the calculated data from the responder matches the answer calculated by the host, then the host authenticates the responder and allows the PDMSP device and the accessory device to start operation and/or substantive communication. Otherwise, the authentication fails, and the authentication element (either alone or in with the aid of the CPU 420 (FIG. 20)) it may inhibit operation of the system 400 (FIG. 20) and provide a warning signal to the user, e.g., through the display 424 (FIG. 20).

In one embodiment, a challenge-and-response authentication scheme may utilize cyclic redundancy check (CRC) in an authentication transform. Challenges and keys of various bit lengths may be used. In one embodiment, a 32-bit random challenge and 96-bit secret ID are used in conjunction with a random polynomial and 16-bit seed value to generate a 16-bit CRC response. A unique CRC polynomial, CRC seed, and device ID value may be used in each device. Such values may be stored as encrypted text in public memory and unencrypted (plain) text in private memory, such that only a host system can decrypt the polynomial, seed, and ID values using a stored secret key. To authenticate a responder, the host reads the encrypted device ID, polynomial, and seed values from public memory, decrypts these values using a secret key, and then generates a (e.g., 32-bit) random challenge. The random challenge is transmitted to the responder, which uses challenge information from the host along with the plain-text version of polynomial coefficients, seed, and device ID to calculate the authentication CRC value. The host uses the polynomial coefficients, seed, and device ID that it decrypted, along with the random challenge that it sent to the responder to calculate the authentication CRC value. The responder authentication CRC value may be transmitted back to the host where the two authentication CRC values are compared, with a match serving to authenticate the responder and initiate system operation and/or substantive communication.

In another embodiment, a challenge-and-response authentication scheme may utilize an iterative hashing algorithm such as the SHA-1/HMAC secure hash algorithm, which has been widely used for authentication of Internet transactions. The authentication method is similar to a CRC-based scheme except it utilizes a different algorithm. The host reads a (e.g., 128-bit) encrypted device ID from the public memory and decrypts those values using the secret key to yield plain-text information with root keys. Then it generates a (e.g., 160-bit) random challenge that is transmitted to the responder, which uses the plain-text version of the ID along with the random challenge to calculate an authentication digest value. The host uses the decrypted ID and the same random challenge to calculate its own authentication digest value. When both digest values have been calculated, the host reads the authentication digest value from the responder and compares that value to its own authentication digest value. If a match is obtained, then the responder is authenticated and system operation and/or substantive communication may be initiated.

In one embodiment, an authentication element employs the Secure Hash Algorithm (SHA-1) specified in the Federal Information publication 180-1 and 180-2, and ISO/IEC 10118-3. An authentication IC embedded in the accessory device processes a host transmitted challenge using a stored secret key and unique ROM ID to produce a response word for transmission back to the host. The secret key is securely stored on-chip and never transmitted between the battery and the host. If each of the secret key and the ROM ID includes 64 bits, the response may include 160 bits.

Figure 22:
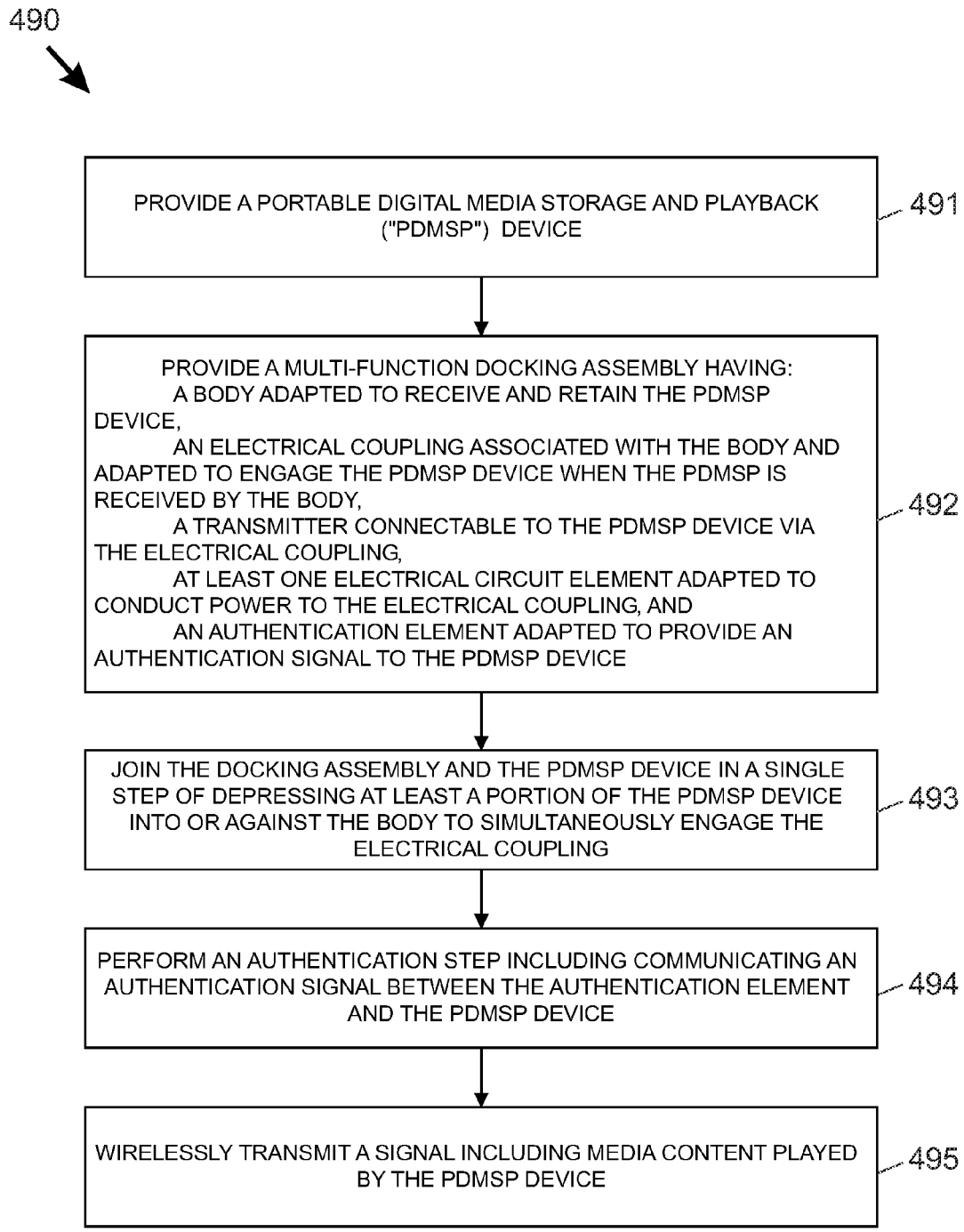
FIG. 22 is a flowchart of a method for communicating a signal from a portable digital media storage and playback device to an external receiving device, the method including an authentication step.

Various methods for broadcasting signals from a PDMSP device to an external receiving device may be employed using devices disclosed herein. FIG. 22 provides a flowchart of one such method for transmitting a signal from a PDMSP to an external receiving device. The method 490 includes multiple illustrative steps. A first step 491 includes providing a PDMSP device. A second step 492 includes providing a multi-function docking assembly as described herein (e.g., including a body adapted to receive and retain the PDMSP device, at least one electrical coupling associated with the body and adapted to engage the PDMSP device when the PDMSP device is received by the body, a transmitter connectable to the PDMSP device via the at least one electrical coupling, at least one electrical circuit element adapted to conduct power to the electrical coupling, and an authentication element adapted to provide an authentication signal to the PDMSP device. A third step 493 includes joining the docking assembly and the PDMSP device in a single step of depressing at least a portion of the PDMSP device into or against he body to simultaneously engage the electrical coupling. A fourth step 494 includes performing an authentication step including communicating an authentication signal between any of the authentication element and the PDMSP device. A fifth step 495 includes wirelessly transmitting a signal including media content played by the PDMSP device. The fifth step is preferably only permitted when an appropriate match or handshake is established between the authentication element and the PDMSP device; otherwise, such functionality may be disabled or diminished by the PDMSP device. In a preferred embodiment, the authentication step preferably further includes the performance of a challenge and response authentication scheme.

In another embodiment, an authentication operation may involve multiple iterative steps to "unlock" various features or functions of a PDMSP device, such that multiple discrete tiers of functionality of the PDMSP device may be enabled or disabled depending on the result of an authentication operation between the PDMSP device and the multi-function docking assembly (or any other suitable accessory device not necessarily involving all the features of, or including features different from, multi-function docking assemblies as described herein). In other words, following an authentication operation, operation of the PDMSP device with a multi-function docking assembly or other accessory may commence, but in a limited or restricted fashion, or in an unrestricted fashion, depending on the result of the authentication operation. Different levels or tiers of operation that may be unlocked, whether individually in combination, depending on the result of an authentication operation include (but are not limited to) the following examples:

enabling powering or charging of a PDMSP device by a docking assembly;

enabling full-quality/full bandwidth communication of digital media content from a PDMSP device to a docking assembly (e.g., through the electrical coupling);

enabling downgraded-quality (e.g., limited bandwidth) communication of digital media content from the PDMSP device to the docking assembly (e.g., through the electrical coupling);

enabling playback of protected digital media content by the PDMSP device, but only for a limited number of times;

enabling digital media content (or only unprotected digital content) to be sent from a docking assembly to the PDMSP device (e.g., through the electrical coupling) to be stored therein;

enabling command signals to be communicated from a docking assembly to the PDMSP device (e.g., through the electrical coupling); and enabling digital media content stored in the PDMSP device to be transmitted via a wireless transmitter.

Thus, authentication elements and authentication methods according to the present invention permit not only "yes/no" threshold operability between a PDMSP device and an accessory device such as a multi-function docking assembly, but also permit discrete functions of a PDMSP device or between the PDMSP device and docked accessory to be enabled or disabled depending on the result of an authentication operation.

While the invention has been described herein with respect to various illustrative aspects, features and embodiments, it will be recognized that the invention is not thus limited, but that the present invention extends to and encompasses other features, modifications, and alternative embodiments, as will readily suggest themselves to those of ordinary skill in the art based on the disclosure and illustrative teachings herein. The claims that follow are therefore to be construed and interpreted as including all such features, modifications and alternative embodiments, within their spirit and scope

What is claimed is:

1. A docking assembly electrically coupleable with a portable digital media storage and playback device, the assembly comprising:
    a body adapted to receive and retain the portable digital media storage and playback device;
    at least one electrical coupling associated with the body and adapted to engage the portable digital media storage and playback device when the portable digital media storage and playback device is received by the body;
    a transmitter connectable with the portable digital media storage and playback device via the at least one electrical coupling and adapted to wirelessly transmit media content from the portable digital media storage and playback device to an external receiving device;
    at least one electrical circuit element adapted to conduct power from an external power source to the at least one electrical coupling;
    a data exchange port; and
    an authentication element adapted to provide an authentication signal to the portable digital media storage and playback device, wherein the authentication element comprises a reprogrammable memory storing an authentication scheme, and the authentication element may be reprogrammed using the data exchange port.

2. The docking assembly of claim 1 wherein the authentication element comprises an integrated circuit.

3. The docking assembly of claim 1 wherein the authentication element comprises a public memory and a private memory.

4. The docking assembly of claim 2 wherein the authentication element is adapted to perform a challenge and response authentication scheme.

5. The docking assembly of claim 1 wherein the authentication signal is provided to the portable digital media storage and playback device through the at least one electrical coupling.

6. The docking assembly of claim 1 wherein the data exchange port comprises a Universal Serial Bus connector.

7. The docking assembly of claim 1 wherein the body defines a cavity that is sized and shaped to receive at least a portion of the digital media storage and playback device.

8. The docking assembly of claim 7 wherein the at least one electrical coupling is disposed in the cavity.

9. The docking assembly of claim 7 wherein at least a portion of the at least one electrical coupling protrudes into the cavity.

10. The docking assembly of claim 1 wherein the at least one electrical coupling comprises a unitary electrical coupling having plurality of electrically conductive contact elements.

11. The docking assembly of claim 1 wherein the plurality of electrically conductive contact elements includes at least ten discrete contact elements.

12. The docking assembly of claim 1 wherein the body includes a housing comprising a plurality of parts.

13. The docking assembly of claim 12 wherein the plurality of parts are removably coupled together.

14. The docking assembly of claim 1 wherein each of the transmitter, the at least one electrical circuit element, and the authentication element is disposed substantially within the body.

15. The docking assembly of claim 1 wherein the body includes a retention element adapted to retain the portable digital media player in position.

16. The assembly of claim 15 wherein the retention element is selectively disengageable.

17. The docking assembly of claim 1 wherein the transmitter comprises a radio frequency transmitter.

18. The docking assembly of claim 1 wherein the radio frequency transmitter comprises a FM transmitter.

19. The docking assembly of claim 18 wherein the FM transmitter has selectively adjustable digital frequency tuning.

20. The docking assembly of claim 17, further comprising a digital frequency indicator display adapted to display the transmission frequency.

21. The docking assembly of claim 1 wherein the at least one electrical circuit element comprises a plug connector engageable with a cigarette lighter socket of a motor vehicle.

22. The docking assembly of claim 1 wherein the external power source comprises a battery or charging system of a motor vehicle.

23. The docking assembly of claim 1 wherein the external power source comprises an alternating current power source.

24. The docking assembly of claim 1, further comprising an adjustable mounting element adapted to maintain the portable digital media storage and playback device in any of a plurality of spatial positions.

25. The docking assembly of claim 24 wherein the adjustable mounting element is affixed to a plug connector engageable with a cigarette lighter socket of a motor vehicle.

26. The docking assembly of claim 1 wherein the at least one electrical coupling comprises a first coupling and a second coupling distinct from the first coupling.

27. A portable digital media storage and playback system comprising:
the docking assembly of claim 1; and
a portable digital media storage and playback device operatively coupled to the docking assembly.

28. The system of claim 27 wherein the portable digital media storage and playback device comprises a second authentication element adapted to communicate with the authentication element of the docking assembly.

29. The system of claim 27, further comprising an external power source operatively coupled to the docking assembly.

30. A method for broadcasting signals from a portable digital media storage and playback device to an external receiving device, the method utilizing the docking assembly of claim 1 and comprising the steps of:
joining the docking assembly and the portable digital media storage and playback device in a single step of depressing at least a portion of the portable digital media storage and playback device into or against the body to simultaneously engage the at least one electrical coupling;
performing an authentication step including communicating an authentication signal between the authentication element and the portable digital media storage and playback device; and
wirelessly transmitting a signal including media content played by the portable digital media storage and playback device.

31. The method of claim 30 wherein the authentication step includes performing a challenge and response authentication scheme.

32. The method of claim 30 wherein the signal including media content is a radio frequency signal.

33. The method of claim 32 wherein the radio frequency signal is a FM signal.

34. The method of claim 30 wherein the joining between the portable digital media storage and playback device is accomplished by a single step of depressing at least a portion of the portable digital media storage and playback device into or against the body to simultaneously engage the at least one electrical coupling.

35. The method of claim 30, wherein the authentication step permits multiple discrete tiers of functionality of any of (1) the portable digital media storage and playback device and (2) the multi-function docking assembly to be enabled or disabled depending on the result of said authentication step.

36. A docking assembly electrically coupleable with a portable digital media storage and playback device, the assembly comprising:
a cavity-defining body adapted to receive and retain the portable digital media storage and playback device;
at least one electrical coupling disposed in the cavity and adapted to engage the portable digital media storage and playback device when the portable digital media storage and playback device is received by the body;
a transmitter connectable with the portable digital media storage and playback device via the at least one electrical coupling and adapted to wirelessly transmit media content from the portable digital media storage and playback device to an external receiving device;
at least one electrical circuit element adapted to conduct power from an external power source through the at least one electrical coupling to the portable digital media storage and playback device;
a data exchange port; and
an authentication element adapted to provide an authentication signal to the portable digital media storage and playback device, wherein the authentication element comprises a reprogrammable memory storing an authentication scheme, and the authentication element may be reprogrammed using the data exchange port.

37. The docking assembly of claim 36 wherein the authentication element comprises an integrated circuit.

38. The docking assembly of claim 37 wherein the authentication element is adapted to perform a challenge and response authentication scheme.

39. The docking assembly of claim 36 wherein the body includes a housing comprising a plurality of parts, and the plurality of parts are removably coupled together.

40. The docking assembly of claim 36 wherein each of the transmitter, the at least one electrical circuit element, and the authentication element is disposed substantially within the body.

41. The docking assembly of claim 36 wherein the body includes a selectively disengageable retention element adapted to retain the portable digital media storage and playback device in position.

42. The docking assembly of claim 36 wherein transmitter comprises a radio frequency transmitter having selectively adjustable digital frequency tuning.

43. The docking assembly of claim 42, further comprising a digital frequency indicator display adapted to display the radio frequency transmission frequency.

44. The docking assembly of claim 36, further comprising an adjustable mounting element adapted to maintain the portable digital media storage and playback device in any of a plurality of spatial positions.

45. The docking assembly of claim 44 wherein the adjustable mounting element is affixed to a plug connector engageable with a cigarette lighter socket of a motor vehicle.

46. A portable digital media storage and playback system comprising:
the docking assembly of claim 36; and
a portable digital media storage and playback device operatively coupled to the docking assembly.

47. The system of claim 46 wherein the portable digital media storage and playback device comprises a second authentication element adapted to communicate with the authentication element of the docking assembly.

48. The system of claim 46, further comprising an external power source operatively coupled to the docking assembly.

49. A method for broadcasting signals from a portable digital media storage and playback device to an external receiving device utilizing the docking assembly of claim 36, the method comprising the steps of:
joining the docking assembly and the portable digital media storage and playback device in a single step of depressing at least a portion of the portable digital media storage and playback device into or against the body to simultaneously engage the at least one electrical coupling;
performing an authentication step including communicating an authentication signal between the authentication element and the portable digital media storage and playback device; and
wirelessly transmitting a signal including media content played by the portable digital media storage and playback device.

50. The method of claim 49 wherein the authentication step includes performing a challenge and response authentication scheme.

51. A docking assembly electrically coupleable with a portable digital media storage and playback device, the assembly comprising:
- at least one electrical coupling adapted to engage the portable digital media storage and playback device;
- a data exchange port;
- at least one electrical circuit element adapted to conduct power from an external power source to the at least one electrical coupling; and
- a body structure housing:
  - a transmitter connectable with the portable digital media storage and playback device via the at least one electrical coupling and adapted to wirelessly transmit media content from the portable digital media storage and playback device to an external receiving device; and
  - an authentication element adapted to provide an authentication signal to the portable digital media storage and playback device, wherein the authentication element comprises a reprogrammable memory storing an authentication scheme, and the authentication element may be reprogrammed using the data exchange port.

52. The docking assembly of claim 51, wherein the authentication element comprises an integrated circuit.

53. A docking assembly electrically coupleable with a portable digital media storage and playback device, the assembly comprising:
- at least one electrical coupling adapted to engage the portable digital media storage and playback device;
- at least one electrical circuit element adapted to conduct power from an external power source to the at least one electrical coupling;
- a transmitter connectable with the portable digital media storage and playback device via the at least one electrical coupling and adapted to wirelessly transmit media content from the portable digital media storage and playback device to an external receiving device;
- a data exchange port; and
- an authentication element adapted to provide an authentication signal to the portable digital media storage and playback device, wherein the authentication element comprises a reprogrammable memory storing an authentication scheme, and the authentication element may be reprogrammed using the data exchange port.

54. The docking assembly of claim 53, further comprising a body structure housing any of the at least one electrical circuit element, the transmitter, and the authentication element.

* * * * *